(12) United States Patent
Chukwu

(10) Patent No.: US 9,341,443 B2
(45) Date of Patent: May 17, 2016

(54) HI-TECH SECURITY GUN WITH A SPECIAL CODING SYSTEM

(71) Applicant: Ahamefula Chukwu, Houston, TX (US)

(72) Inventor: Ahamefula Chukwu, Houston, TX (US)

( * ) Notice: Subject to any disclaimer, the term of this patent is extended or adjusted under 35 U.S.C. 154(b) by 0 days.

(21) Appl. No.: 13/986,397

(22) Filed: Apr. 26, 2013

(65) Prior Publication Data

US 2014/0318426 A1    Oct. 30, 2014

(51) Int. Cl.
| | | |
|---|---|---|
| F41G 5/06 | (2006.01) |
| E05G 1/02 | (2006.01) |
| F41G 3/00 | (2006.01) |
| F41G 1/35 | (2006.01) |
| F41A 17/06 | (2006.01) |
| F41A 17/08 | (2006.01) |
| F41A 27/06 | (2006.01) |
| F41A 27/28 | (2006.01) |

(52) U.S. Cl.
CPC .. *F41G 5/06* (2013.01); *E05G 1/02* (2013.01); *F41A 17/063* (2013.01); *F41A 17/08* (2013.01); *F41A 27/06* (2013.01); *F41A 27/28* (2013.01); *F41G 1/35* (2013.01); *F41G 3/00* (2013.01)

(58) Field of Classification Search
USPC ............ 89/27.3, 38, 39, 37.21, 41.01, 41.02, 89/41.03, 41.05, 41.15, 28.05, 28.1, 28.2; 42/1.01–1.05
See application file for complete search history.

(56) References Cited

U.S. PATENT DOCUMENTS

| | | | | |
|---|---|---|---|---|
| 1,198,557 | A * | 9/1916 | Knotts | 89/38 |
| 1,327,085 | A * | 1/1920 | Dawson et al. | 89/38 |
| 4,112,818 | A * | 9/1978 | Garehime, Jr. | 89/41.05 |
| 4,644,845 | A * | 2/1987 | Garehime, Jr. | 89/41.05 |
| 5,379,676 | A * | 1/1995 | Profeta et al. | 89/41.05 |
| 5,949,015 | A * | 9/1999 | Smith et al. | 89/41.05 |
| 6,237,462 | B1 * | 5/2001 | Hawkes et al. | 89/41.05 |
| 6,269,730 | B1 * | 8/2001 | Hawkes et al. | 89/41.05 |
| 6,415,542 | B1 * | 7/2002 | Bates et al. | 42/70.11 |
| 6,678,984 | B1 * | 1/2004 | Rapp et al. | 42/70.11 |
| 7,168,357 | B2 * | 1/2007 | Hodgkinson | 89/1.11 |
| 7,231,862 | B1 * | 6/2007 | Quinn | 89/41.05 |
| 7,836,811 | B1 * | 11/2010 | Gardner et al. | 89/40.04 |
| 2007/0039602 | A1 * | 2/2007 | Caspi | 124/74 |
| 2009/0026239 | A1 * | 1/2009 | Chenel | 224/401 |
| 2009/0120275 | A1 * | 5/2009 | Chukwu | 89/41.05 |
| 2014/0173962 | A1 * | 6/2014 | Goren et al. | 42/70.11 |

* cited by examiner

*Primary Examiner* — Jonathan C Weber

(57) ABSTRACT

A high-tech security gun that works with Wi-Fi or any other special network, and will not work when it is removed from the address installed by its provider. The gun does not point forward at anyone except it is operated to point at any direction, when controlled wirelessly with a special module.

2 Claims, 23 Drawing Sheets

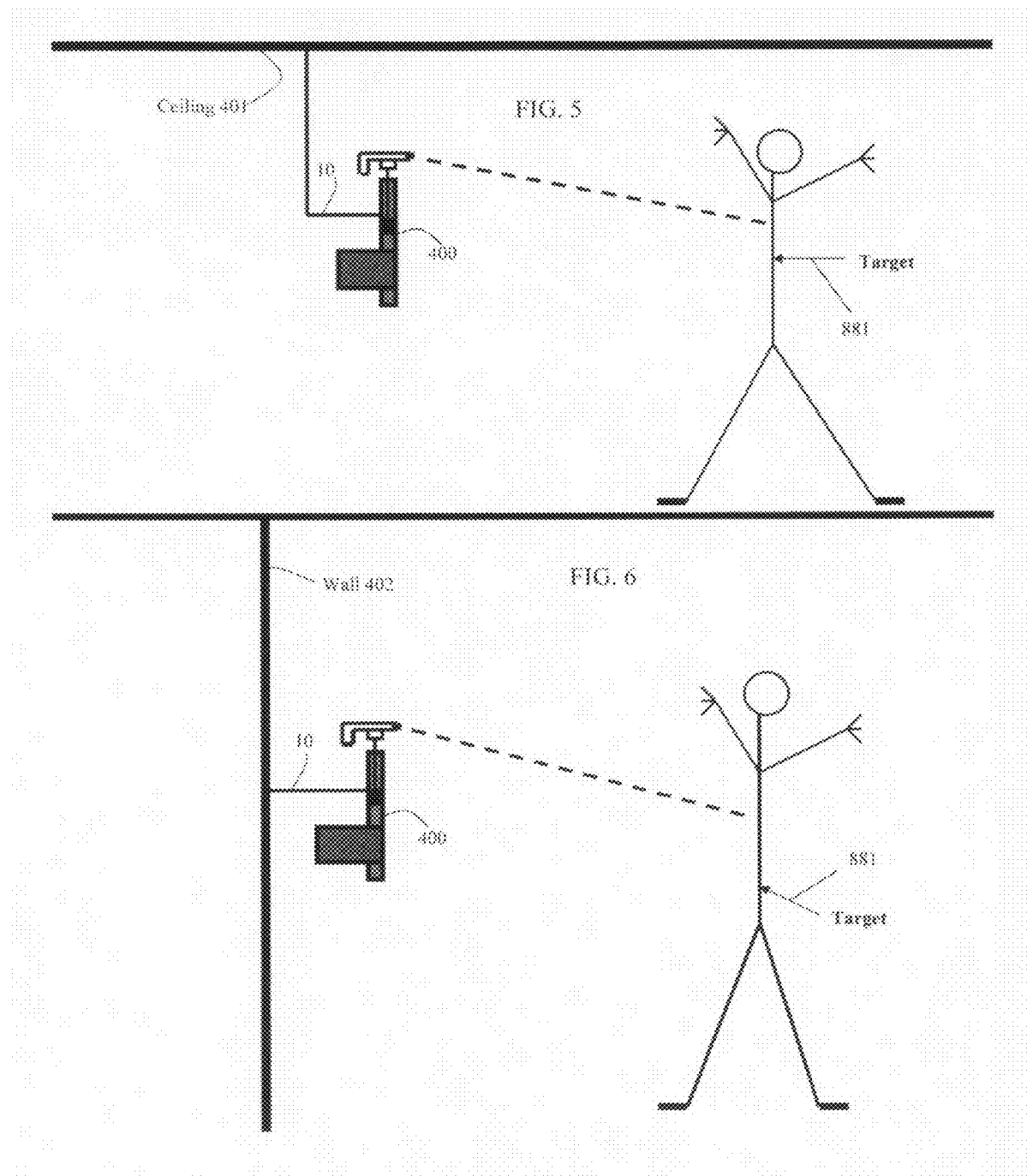

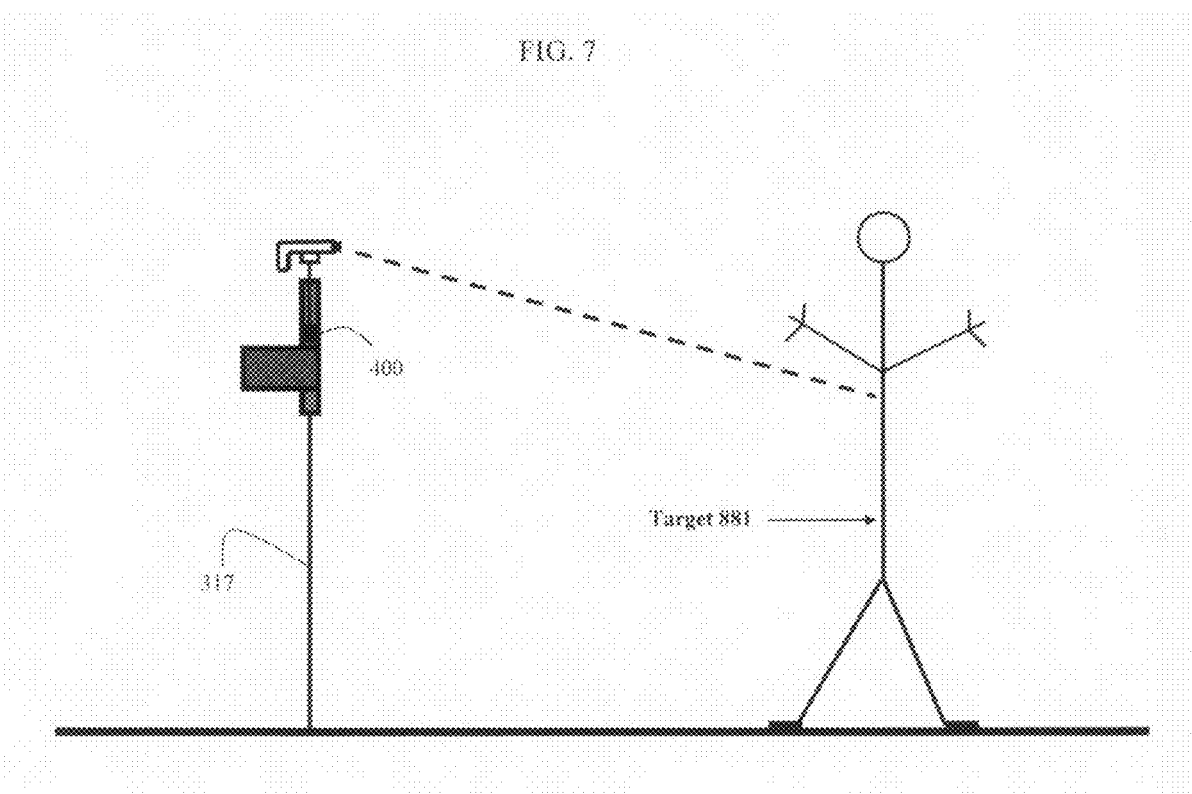

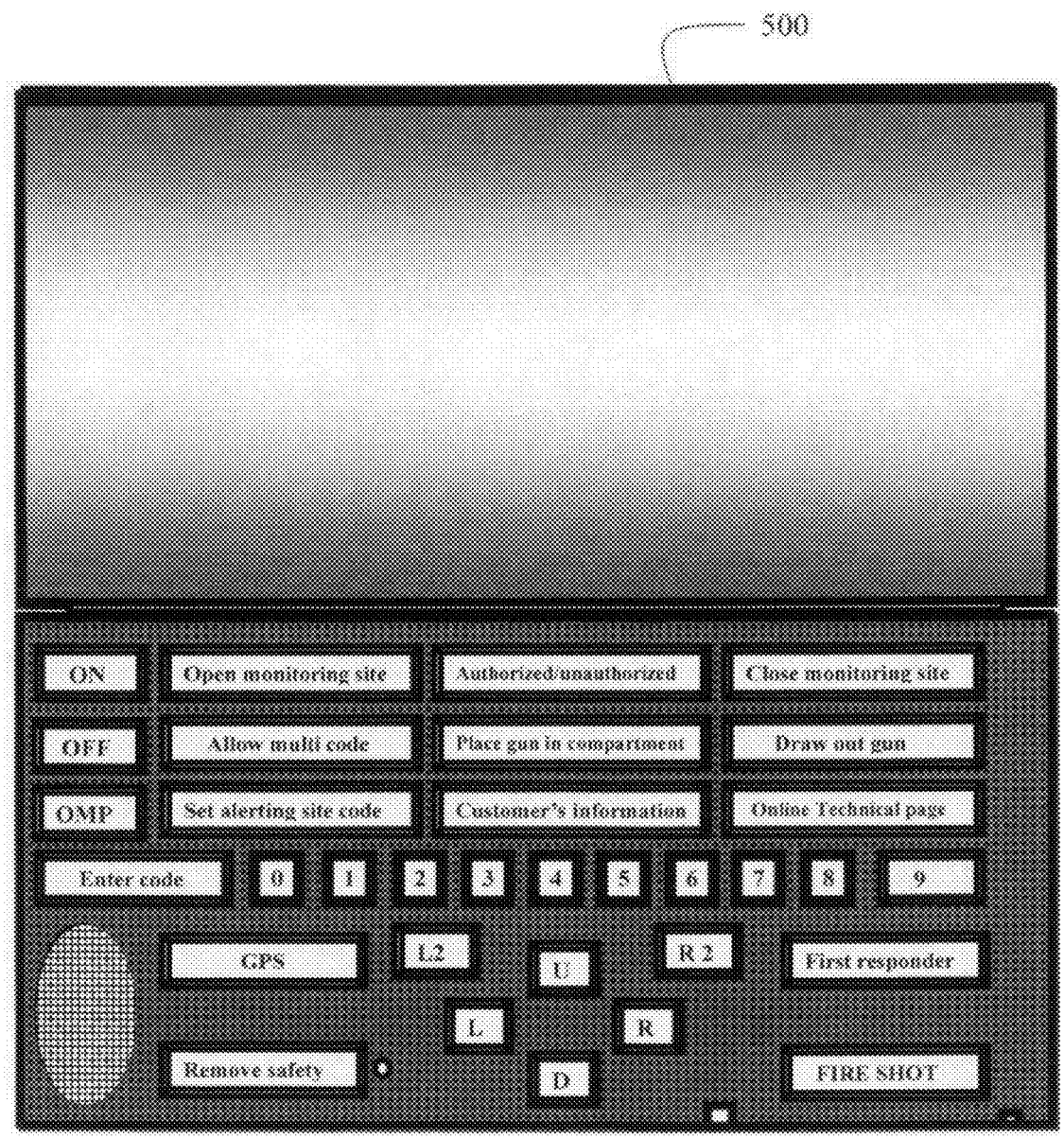

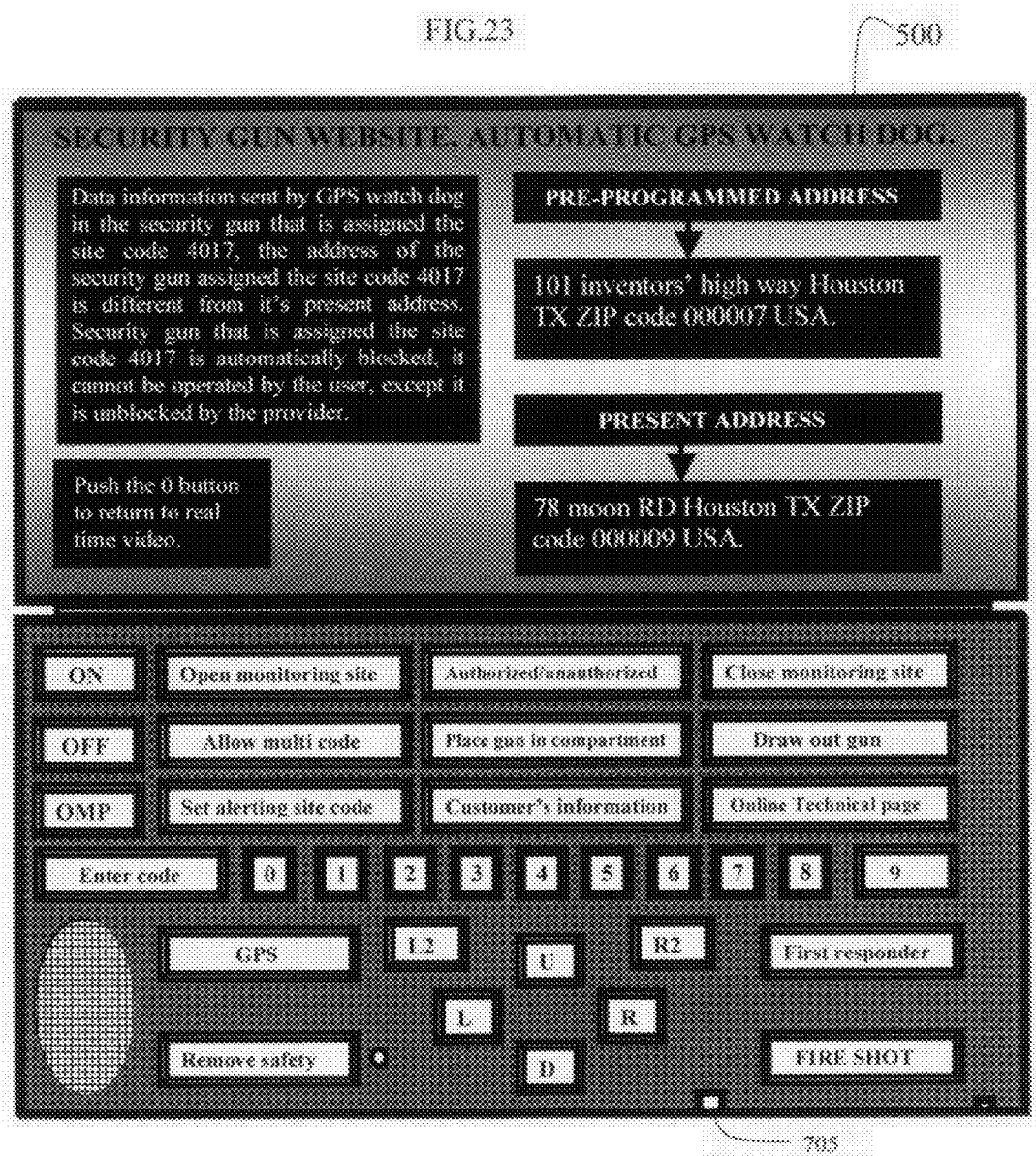

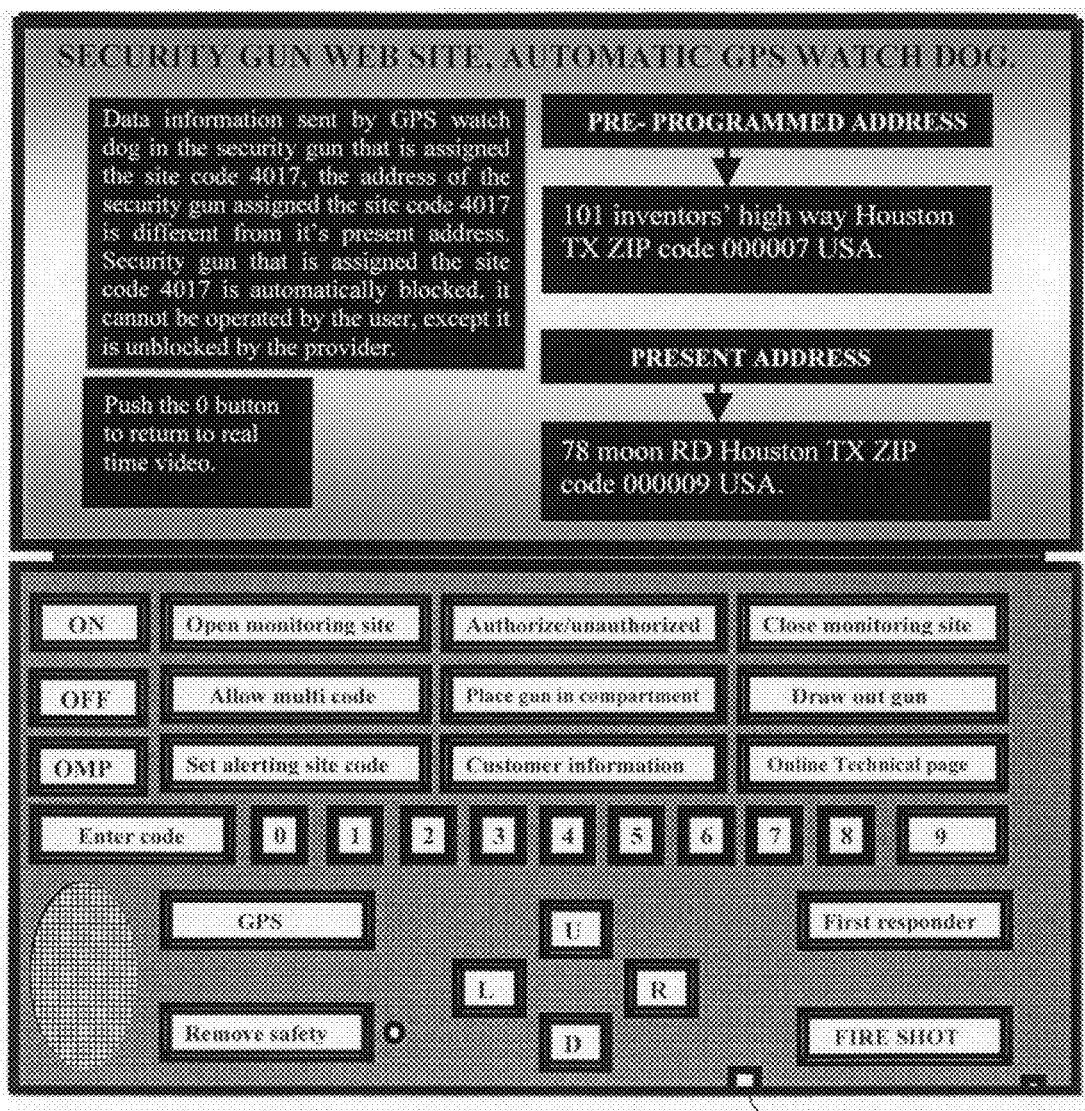

FIG 23

Whenever the user push any of the following buttons, (customer information, online technical page, set alerting site code, allow multi code, GPS, authorize/unauthorized,) and the user wants to return to the real time video, the user should push the 0 button in the coding system to return to the real time video that is displayed on the site code the user is monitoring. This information is automatically displayed on the monitor in the coding system. Any special navigation stick can be connected to the input 705, in the coding system. The navigating stick can be use by users to navigate the gun to point to any direction when the gun is drawn out. The four navigating buttons work very well so users may not have to use a navigating stick. Most help information on how to use the coding system are automatically displayed on the monitor in coding system, so that authorized users will not have any difficulty using the coding system.

HI-TECH SECURITY GUN WITH A SPECIAL CODING SYSTEM

BACKGROUND OF THE INVENTION

Field of Invention

I am against those that commit horrific crimes in our society.

The present invention is a security gun. Security gun is a high-tech gun; it works with Wi-Fi or any other special network unlike any other gun. The security gun does not work when it is removed from the address installed by the provider. The security gun does not point forward at anyone except if it is operated to point. The security gun has a safety compartment, a compartment that is specially designed on its embodiment to conceal the gun. The gun is placed in its safety compartment and can be operated by the user to be drawn out of the safety compartment to point at any direction at a target.

SUMMARY OF THE INVENTION

The present invention is a security gun. The security gun can only be operated with the use of a special internet connectable module or coding system that cannot be hacked by hackers. The security gun cannot be operated with the regular computer, the security gun can only be operated with the use of a special module or coding system that has some special buttons that is not found in a commonly known computer. There are many features that make the security gun safe, which are explained in the drawings. The security gun will provide the topmost security in the event of an emergency like mass school shooting or in the case of a public bombing. The security gun has many areas it can be use, such as for example, to protect homes, shops, and property. People will pay service fees to enjoy the safety and security of the security gun.

The security gun is specially designed to be remotely operated by using a special coding system that is a flip monitor that can connect to the internet automatically when a numeric code assigned to a particular security gun is entered to a monitored internet site displayed on the coding system. The monitoring internet site is also called in this writing the security gun website. When the numeric code is entered into the security gun website site, a real time video of the location were the security gun is mounted is displayed on the monitor in the coding system. A trained law enforcement officer, or security guard or any person authorized or assigned to operate the coding system can easily take action on a suspect by using the coding system to operate the security gun when there is an emergency.

The present invention discloses a security gun that can be remotely operated from anywhere with the use of a special internet connectable module or coding system that cannot be hacked. The gun is specially designed to eliminate or put a suspect or suspects under control in the event of an emergency like school massacre or armed robbery in a shop.

The security gun can fire different kind of ammunitions. The security gun can fire ammunitions that can cause injury or death. (2) The security gun can fire ammunitions that causes sleeping or temporary paralysis. (3) The security gun can fire ammunitions that can cause pain but do not cause death. (4) The security gun can fire ammunitions that delivers high voltage to the human body but do not cause death. (5) The security gun can fire ammunition that delivers unpleasant gas, example, tear-gas. (6) The security gun can fire ammunitions that delivers paint stance to the human body or clothing, example if the security gun is used in movies.

The Security gun comes with some inbuilt property, for example: (1) two cameras for aiming, and monitoring a target visually; (2) a laser pointer for accurate aiming of shots; (3) a speaker for communicating with anybody in the location of the security gun; (4) a microphone that detect detects any sound in the location were the security gun is mounted; and (5) a motion detector that detects motion. The motion detector can be set to automatically activate the camera in the security gun to send video and audio signal of an emergency to the security gun website.

officers/users monitoring the security gun website can take action on the suspect(s) from anywhere by using the coding system to operate the security gun to fire shot at the suspect.

The officers monitoring the security gun website can communicate with the suspect through the speaker in the embodiment of the security gun, and listen to any one in the location of the security gun through the microphone in the embodiment of the security gun. Officers using the coding system can negotiate with the suspect, example, bank robber, or a person committing a crime in the location of the security gun.

The security gun is designed with the best quality of electronics and mechanical parts or materials.

BRIEF DESCRIPTION OF THE DRAWINGS

FIG. 1 to FIG. 7 describes the embodiment of the security gun how it is mounted, and how it works.

FIGS. 8 to 23 describes the embodiment of the coding system and the method of operating the security gun using the coding system.

DETAILED DESCRIPTION OF THE PREFERRED EMBODIMENT

Figure 1:
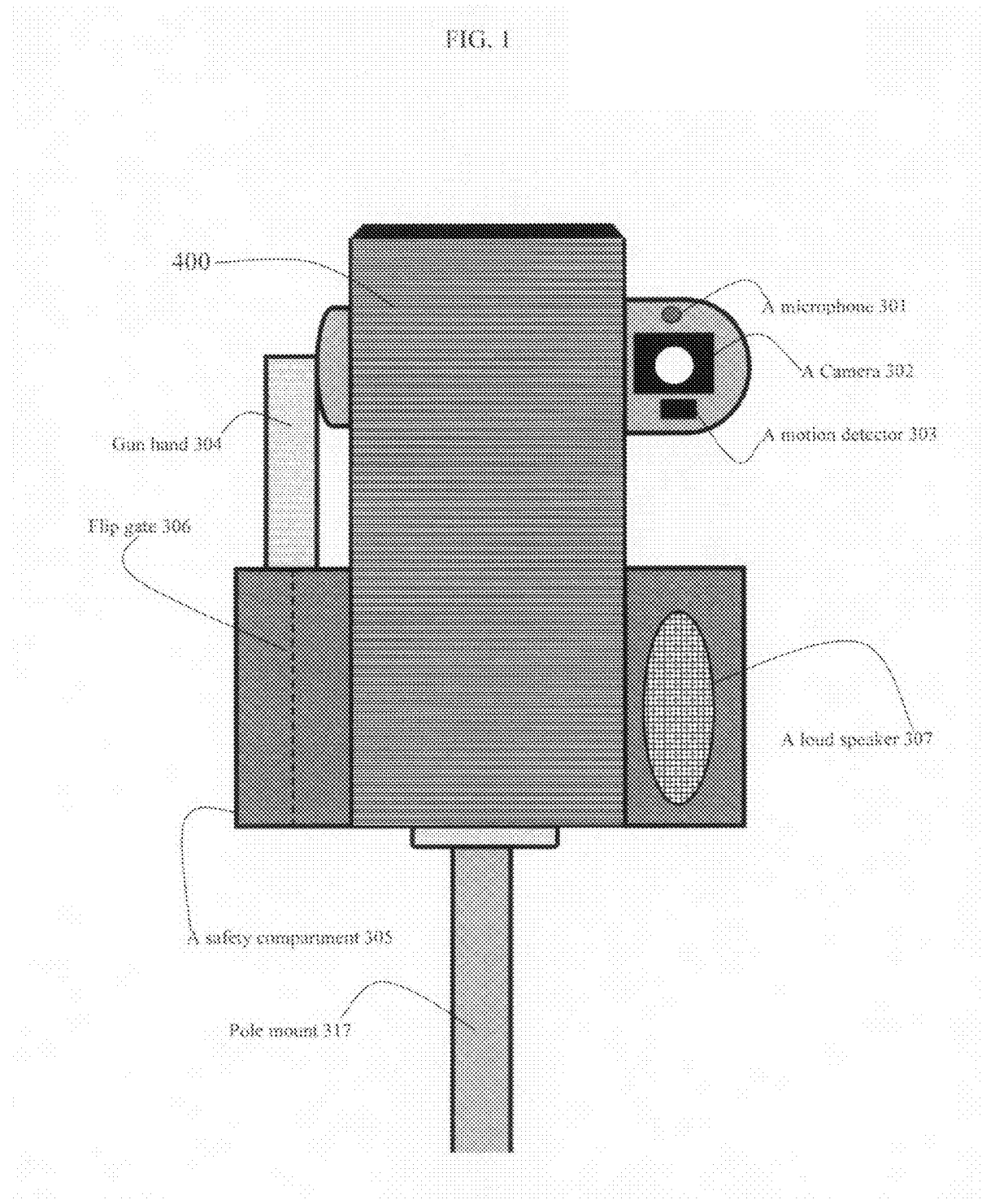

FIG. 1 Is the embodiment of the security gun 400. The security gun 400 comes with 2 cameras that monitor video images of the area were the security gun 400 is mounted. The video images are automatically sent on real time through the internet to be received by the coding system. The security gun 400 also comes with an inbuilt microphone 301, and a loud speaker 307.

Figure 2:
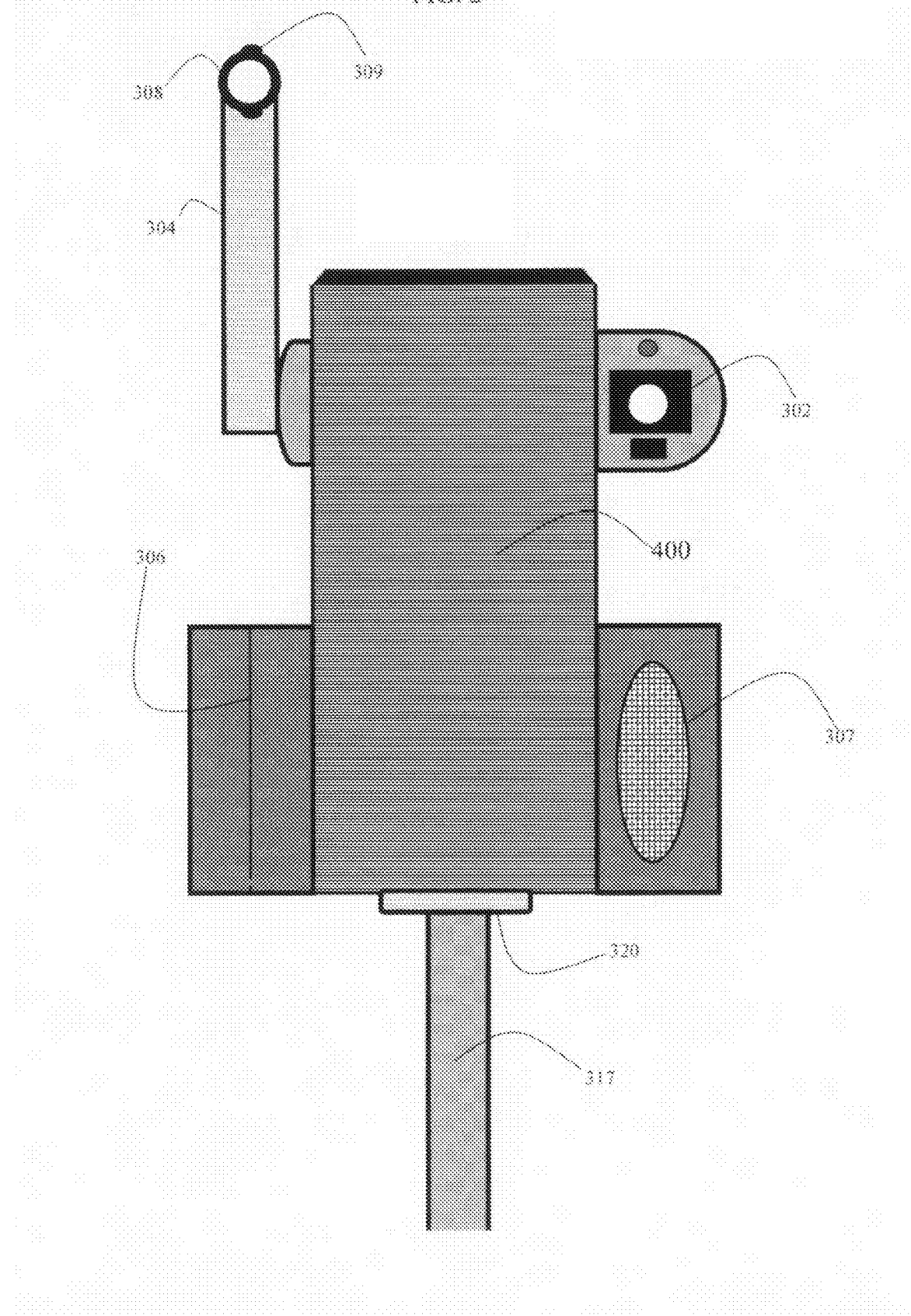

FIG. 2 is an embodiment of the security gun 400. Security gun 400 is made with a thick metal that can withstand most bullets during combat, protecting the parts and electronics inside the embodiment. The security gun 400 has two cameras, one is camera 302, and the other is camera 309 mounted on the gun nozzle, see FIG. 3. The camera 302 is in constant use when the gun 308 is in its safety compartment except when the gun 308 is remotely operated by the user to point at a target, then the camera 302 stops working and the camera mounted on the gun nozzle 309 automatically starts working, replacing camera 302.

Figure 3:
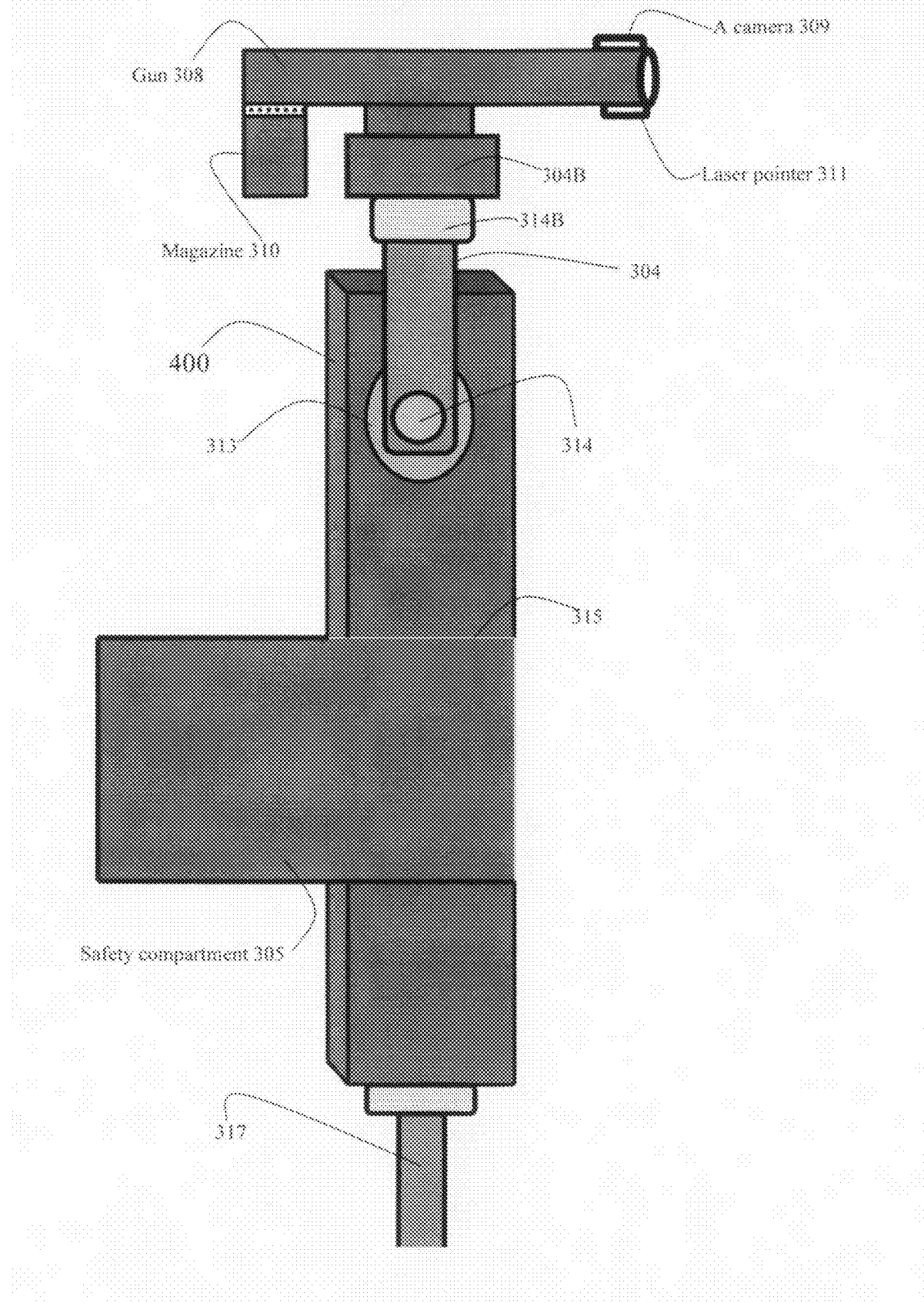

In FIG. 3, a side view of security gun 400 is shown. The gun 308 in the security gun 400 cannot be fired by a human hand, it is completely installed to it's hand 304. In this drawing, the gun 308 is operated out of it's safety compartment. The user can remotely operate the gun 308 to turn left, right, up, and down or turn 360 degree, or place the gun 308 into it safety compartment 305. The security gun hand 304 is made of joint 314, and electric motors 313. The mechanical parts of the gun hand 304 are designed with many special moving joints and parts, for example, special moving joints 314B with movable axis that allow the gun 308 to turn 360 degree on it's hand and a part or compartment 304B in the hand 304 that the gun 308 is completely installed in, it consist of special moving joint, and parts that move the gun, or triggers the gun to fire when operated by the user.

Examples of parts incorporated into the compartment 304B in the gun hand 304 are cranks and electric motor and many other special parts. Here is the gun magazine 310, the magazine 310 that can hold many bullets. So many different types of magazine 310, which in turn are configured to hold different types of ammunitions that can be inserted into the gun 308. The security gun hand 304 can also be made hydraulic powered hand 304 with many special mechanical moving joints that will meet the technology of this invention.

Figure 4:
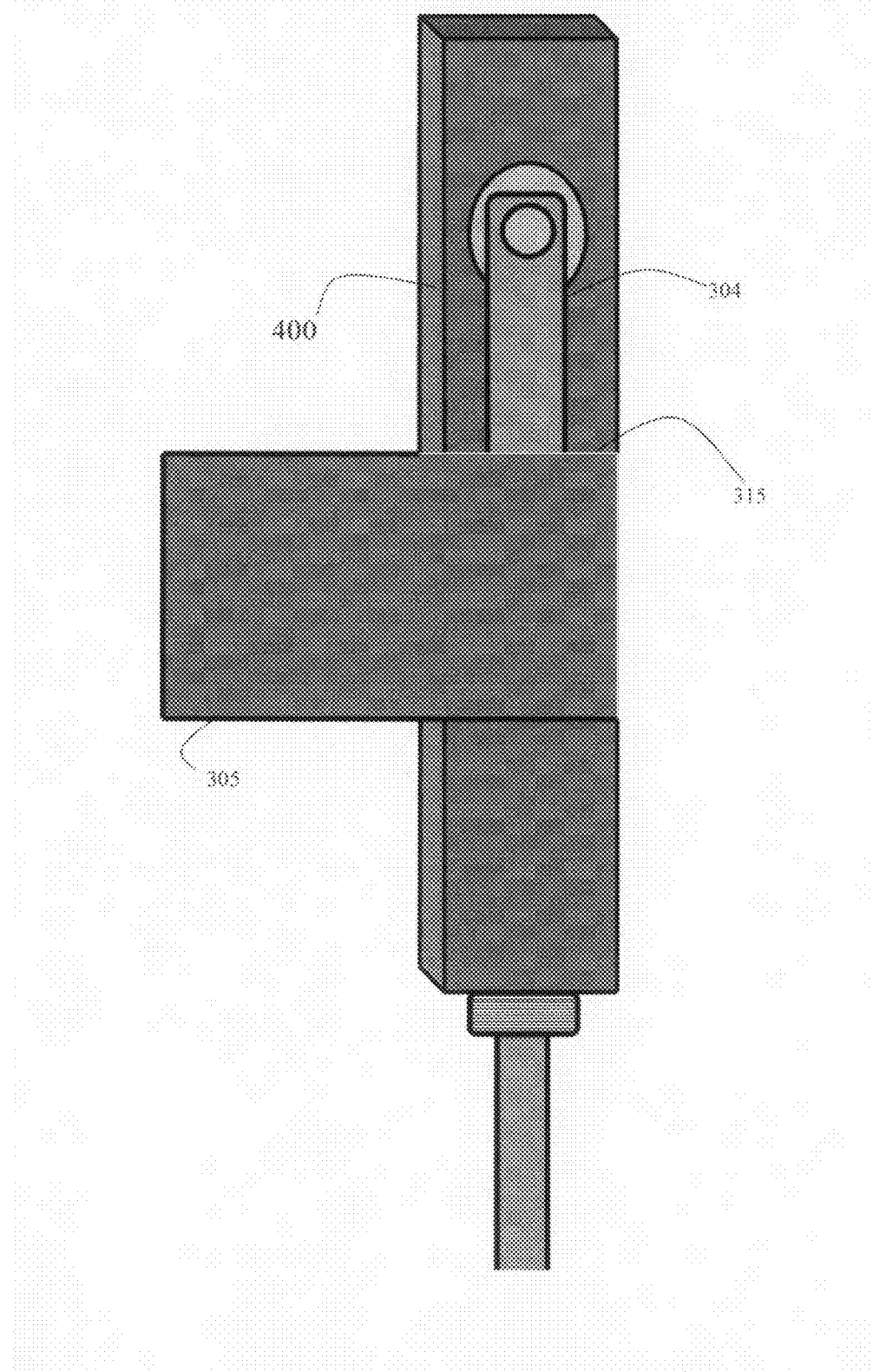

FIG. 4 is an embodiment of the security gun 400. In this drawing, the security gun 400 is moved by the user to it's safety compartment 305. The safety compartment 305 has an opening 315 where the gun enters through. The flip gate 306 is designed to close when the gun is completely in, see FIG. 2, and the flip gate opens 306 when any kind of weight or force is applied on the gate. The flip gate 306 opens by the weight of the gun 308 going into it's safety compartment 305, and closes back when the gun 308 is completely inside its compartment 305. The opening 315 in the safety compartment enables the gun to be placed into the compartment without any difficulty concealing the gun 308. The safety compartment 305 is made with metal and it is located in the embodiment of the security gun 400.

FIG. 5 is an embodiment of the security gun 400. As shown in this drawing, the security gun 400 can be mounted on the ceiling 401 with the use of a rod 10 connected to the back side of the security gun 400. The gun 308 is brought out of it's safety compartment, and it is pointed at a target 881. The security gun 400 is mounted in this manner in special location indoor or outside, for example, in school, public or private property, business premises, homes, prisons and more.

FIG. 6 is an embodiment of the security gun 400. As shown in this drawing, the security gun 400 can be mounted on the wall 402 with the use of a rod 10 connected to the back side of the security gun 400. The gun 308 is brought out of it safety compartment and it is pointed at a target 881. The security gun 400 is mounted in this manner in special location indoor or outside, for example, in industrial building, public or private property, business premises, homes, prisons and more.

FIG. 7 is an embodiment of the security gun 400. As shown in this drawing, the security gun 400 can be mounted on pole 317 in a public, or private place inside, or outside a building, for example, homes, school, office or shop. Security gun 400 drawing in FIGS. 1 to 7 shows the embodiment of the security gun 400 mounted on a pole 317 and a part to insert the pole 320 see FIG. 2. The pole 317 can be mounted on the ground, floor or on a stand. Electrical circuits or wires that power the security gun can be sent through the pole if the pole is a type with a hole in the middle.

FIG. 8 is an embodiment of the security gun operating module 500 also called coding system 500. The coding system 500 is a flip monitor that can be powered by an alternate current power supply or battery. The coding system 500 is specially designed to operate the security gun 400 and it uses Wi-Fi internet network or any other special network. The coding system 500 is very safe because it comes with some special buttons. These special buttons are easy to identify, and they are named below.

As depicted, the special buttons include: [1] Open monitoring site [2] Enter code [3] Close monitoring site [4] Allow multi code [5] Online Technical page [6] First Responder [7] Draw out gun. [8] Place gun in compartment. [9] Customer information [10] Set alerting site code [11] Remove safety [12] OMP [13] Fire shot [14] Authorized/unauthorized [15] GPS, and the coding system also comes with other regular numeric buttons labeled 0 to 9, and the regular ON and OFF buttons. The coding system also comes with four navigating buttons labeled L, R, U, D. and other special inbuilt features; a microphone auxiliary jack input, and an inbuilt speaker. The coding system 500 comes with an inbuilt LCD monitor. These features are easily seen in the embodiment of the coding system 500 without any special labeling. The functions of the listed buttons will be explained from FIG. 9 to FIG. 23.

Figure 9:
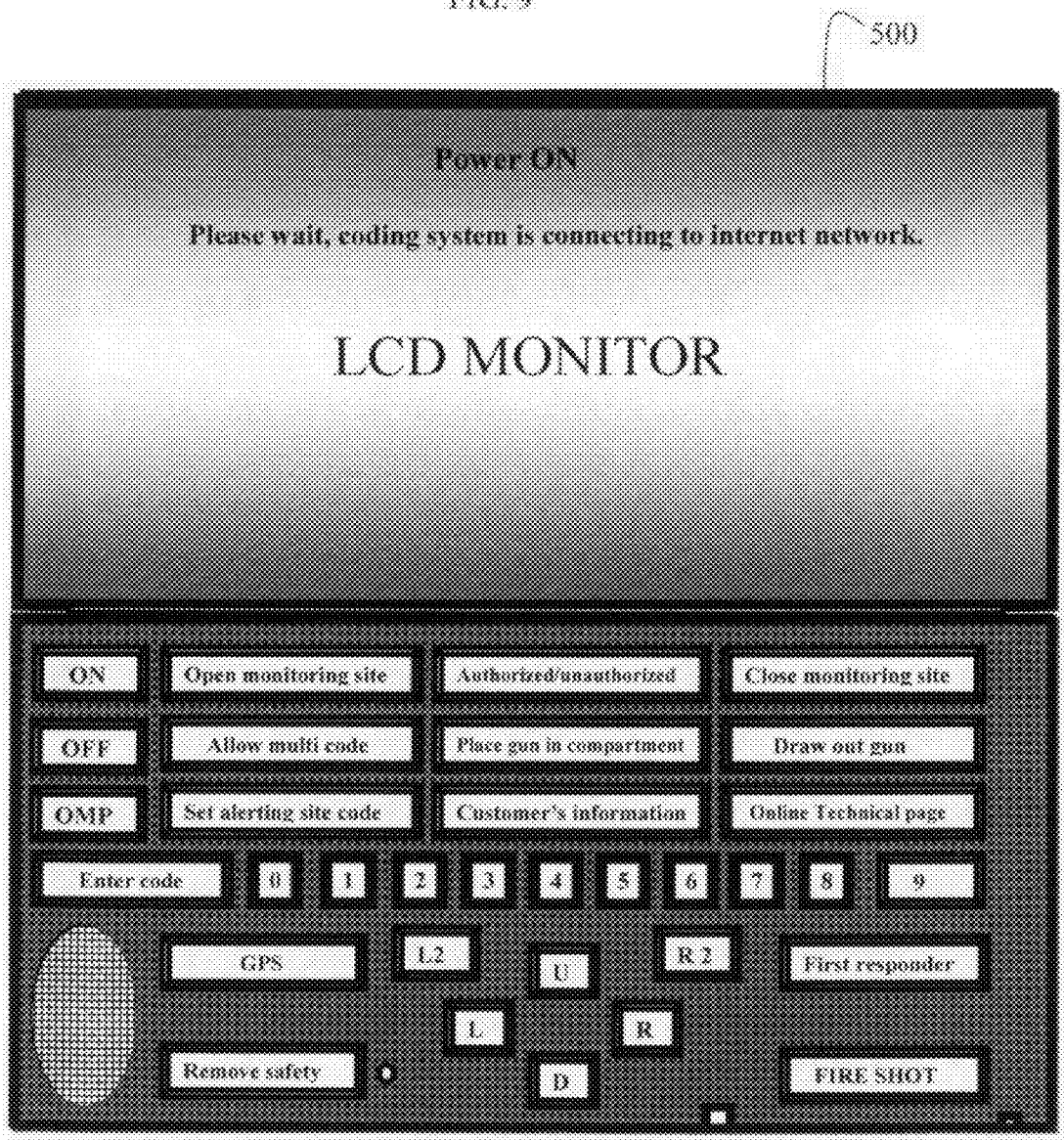

FIG. 9 is an embodiment of the coding system 500 configured for operating the security gun. In this drawing, the coding system 500 is turned ON by the user pushing the ON button. The LCD monitor, displays power ON, Please wait, coding system is connecting to internet network. The user can turn off the coding system 500, if the users wants to turn the coding system 500 off, the user can do that by pushing the off button.

Figure 10:
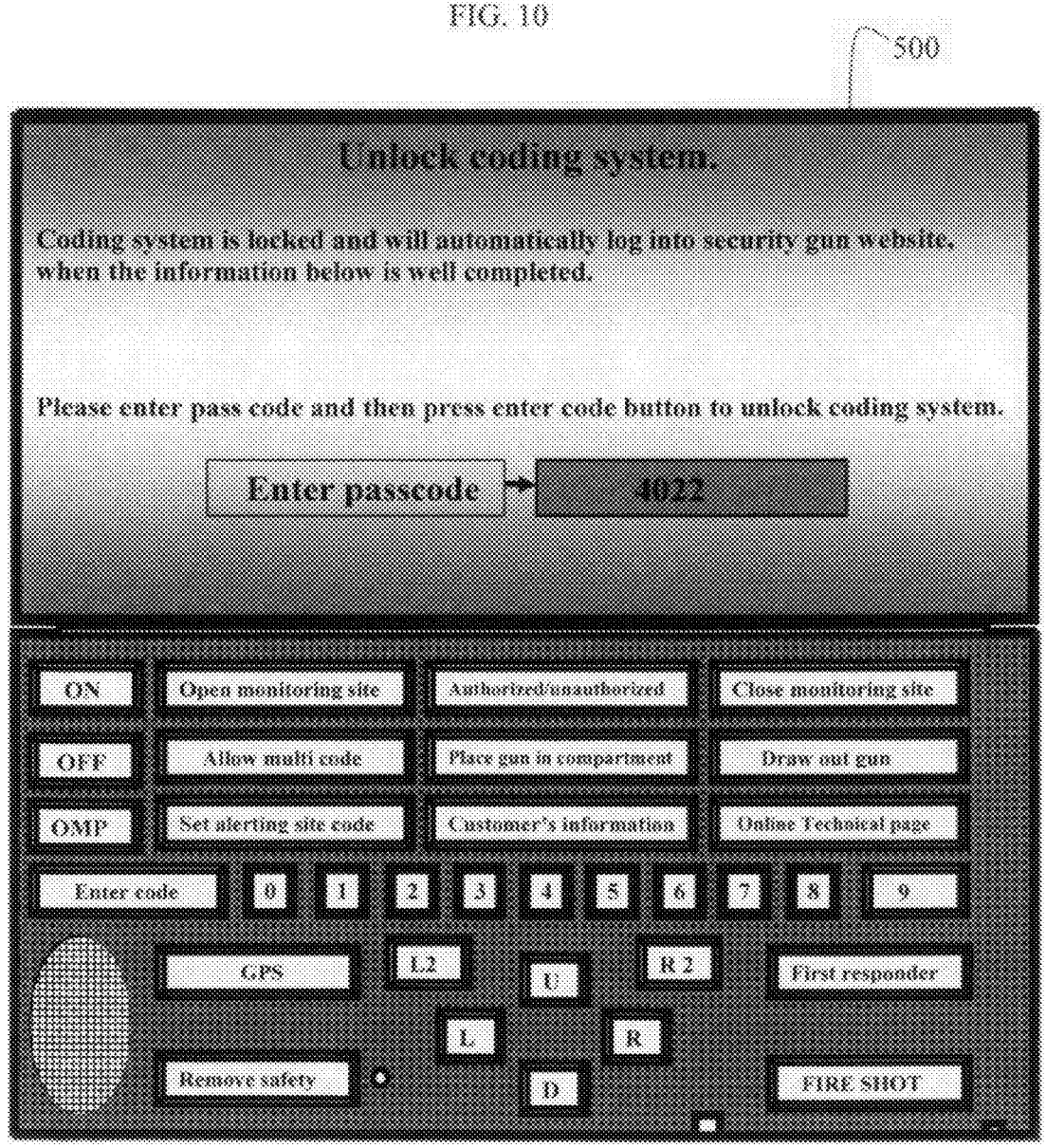

In FIG. 10, it is shown that the user must enter a special numeric code provided by the security gun 400 provider to unlock the coding system 500. When the coding system 500 is unlock, the coding system will automatically display the security gun 400 website, a website used for controlling the security gun 400 as well as monitoring the location were the security gun 400 is mounted. The website is also used for operating the security gun 400, and for receiving data information about the security gun 400. Numeric codes are entered using the 0 to 9 buttons located in the embodiment of the coding system 500. The numeric codes are entered to unlock the coding system 500.

Figure 11:
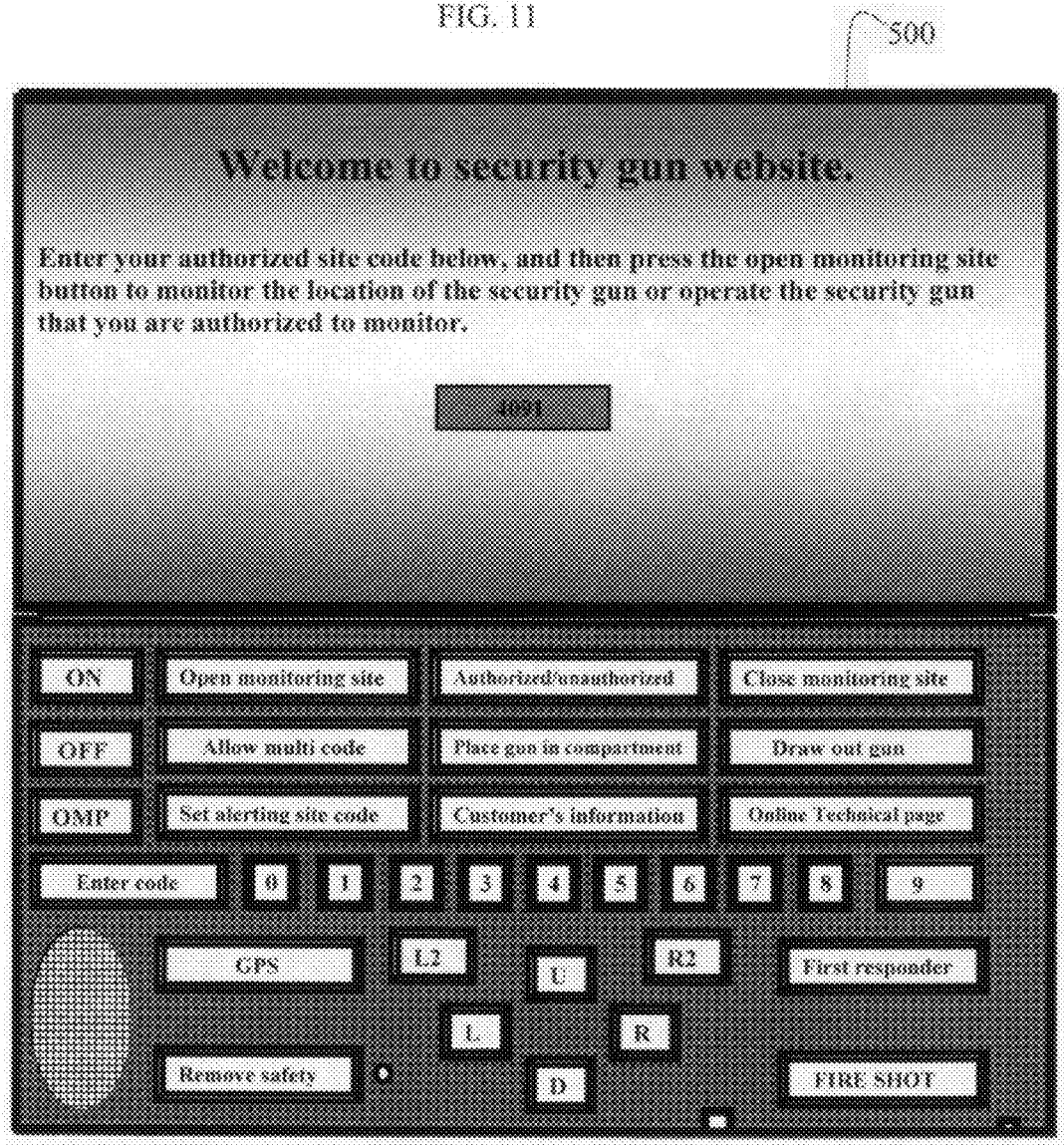

In FIG. 11, it is shown that the coding system 500 displays the sentence, welcome to security gun website, then, the user is asked to enter an authorize site code. Therefore, each security gun has a pre-assigned site code. The site code is use for gaining access into the monitoring site of a particular security gun. Therefore, to gain access also means to operate the security gun 400 or to monitor the location were the security gun 400 is mounted or to check data information about the security gun 400. The user enters the site code using the numeric buttons numbered 0 to 9 in the embodiment of the coding system 500. The site code can be a 4 to 8 digit number.

Figure 12:
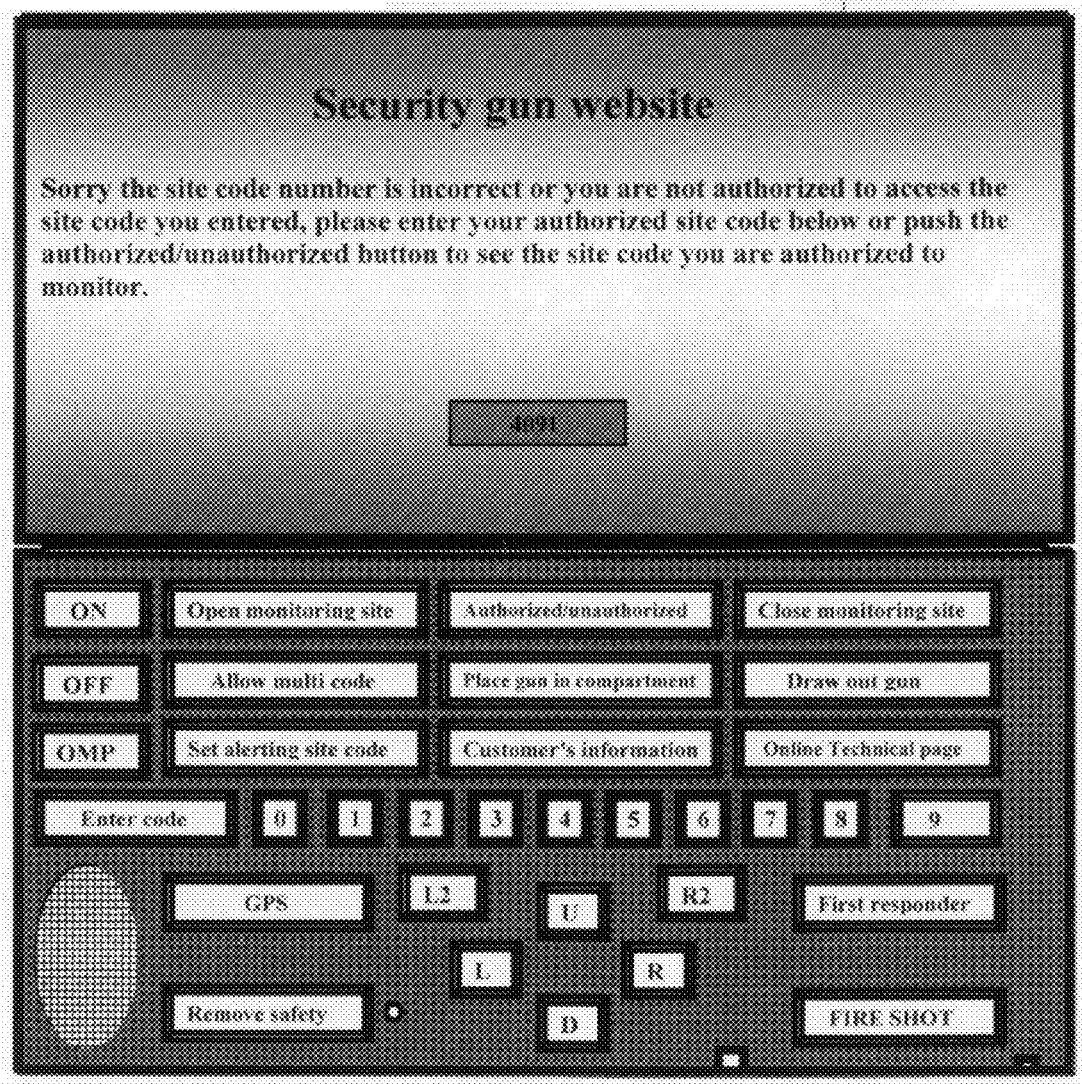

In FIG. 12, it is shown that the coding system 500 displays the sentence sorry the site code number is incorrect or you are not authorized to access the site code you entered, please enter your authorized site code below or push the authorized/unauthorized button to see the site code you are authorized to monitor. If the user enters the wrong site code or the site code entered by the user is not authorized to be used in the coding system 500, the coding system 500 will not accept the site code. The provider is the agent or company that provides the service of the security gun 400. The provider pre-programs all coding system 500 through the security gun website to accept only the authorized site code.

Figure 13:
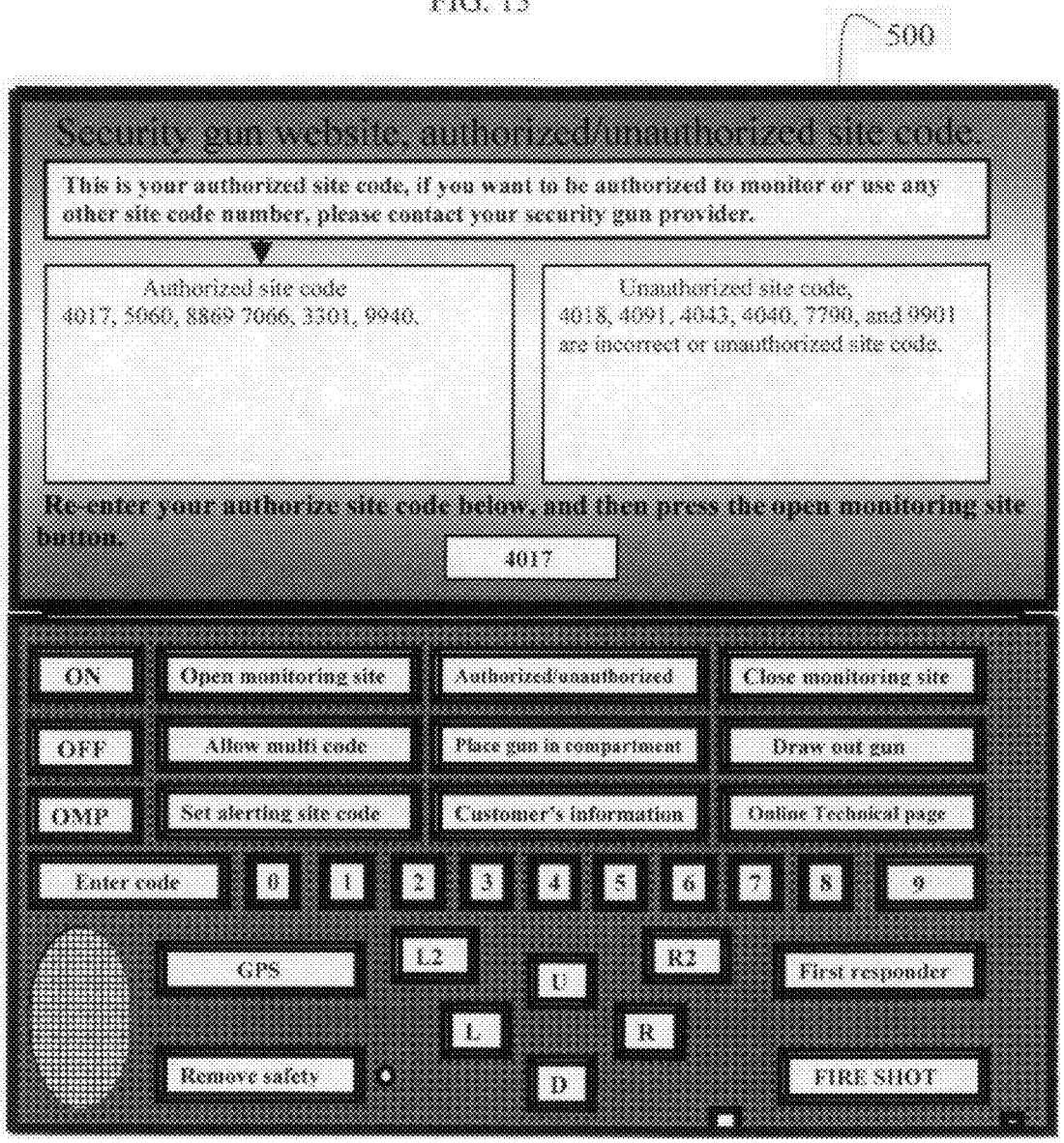

In FIG. 13, it is shown that if the authorized/unauthorized button is pushed by the user, the user can see the site code that is authorized in a particular coding system 500 pushing the authorized/unauthorized button, the site code is automatically displayed on the security gun website. The provider of the security gun may choose to disable the display of the authorized site code when the authorized/unauthorized button is pushed, if they do not want the user to see the authorized site codes. In FIG. 13 the coding system 500 displays the sentence this is your authorized site code, if you want to be authorized to monitor or use any other site code number, please contact your security gun provider. The coding system 500 also displays the authorized site code and some of the incorrect or unauthorized site code. The coding system 500 can detect any unauthorized site codes. The coding system 500 only allows the site code programmed by the security gun provider. One person operating one coding system 500 can only be allowed to monitor a minimum of 1 to 6 security guns or a maximum of 14 security guns. The user of the coding system 500 can set up to 14 auto alerts, which mean setting 14 alerting site codes. Setting alerting site code also means that the security gun 400 that has the site code numbers that is set will alert the user when the motion detector in the security gun 400 detects any movement in their location.

Figure 14:
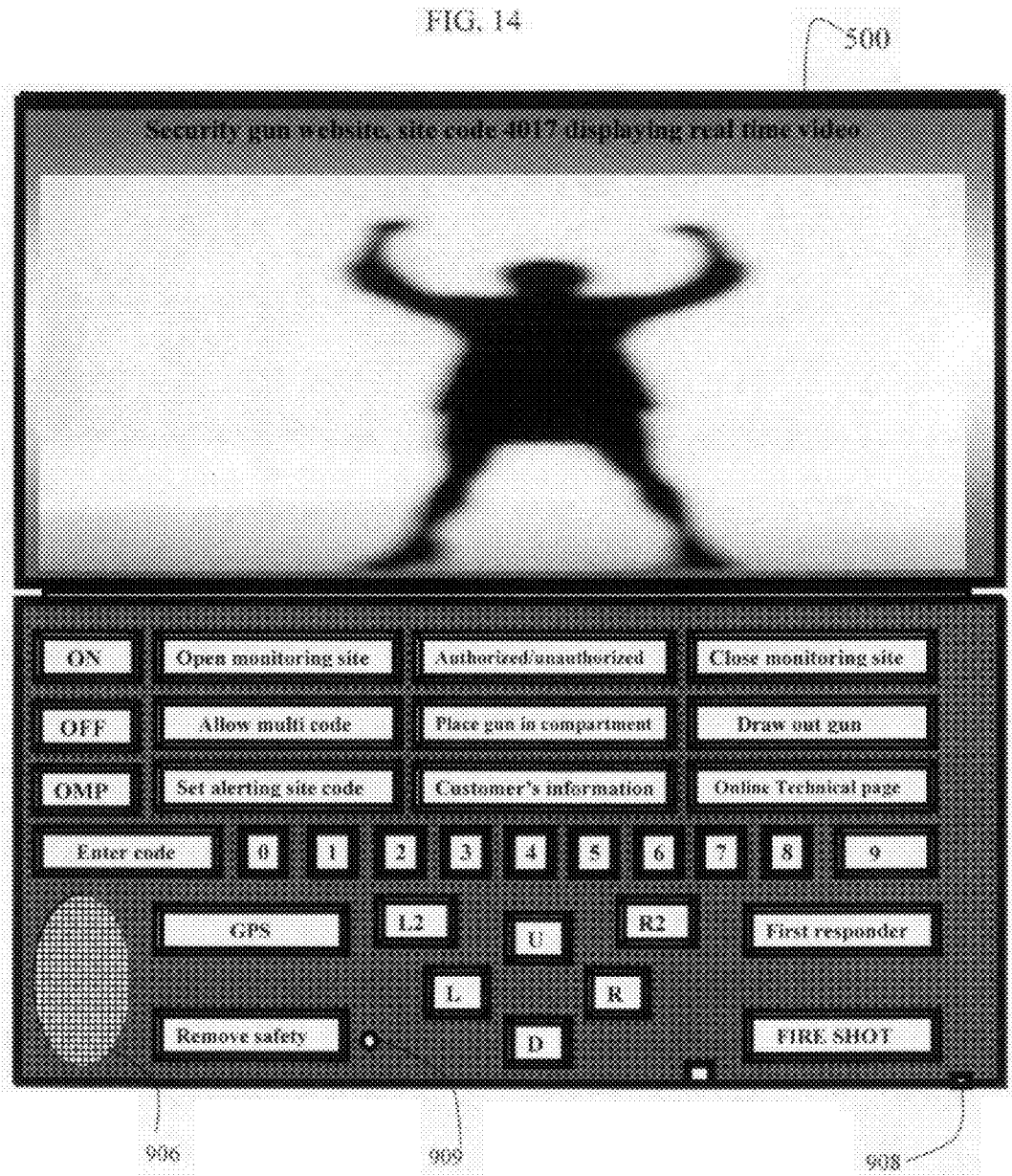

FIG. 14, the coding system 400 displays the sentence, security gun website, site code 4017 displaying real time video. So, here is the four navigating buttons L, R, D, and U they are for navigating, moving the gun 308 to any preferred position of the user's choice. The user can fire shot at a suspect by first pushing the draw out gun button and then the remove safety button then uses the navigating buttons to position the gun 308, then the user now pushes the fire shot button to fire shot or shots. An LED 909 lights up when the remove safety button is push by the user. A speaker 906 on the embodiment of the coding system 500 receives sound feedback from the location were the security gun 400 is mounted. A head set with microphone can be connected to an input 908 for communicating with anyone in the location of the security gun 400. The user can place the gun back in it's safety compartment 305 by pushing the place gun in compartment button in the embodiment of the coding system 500.

Figure 15:
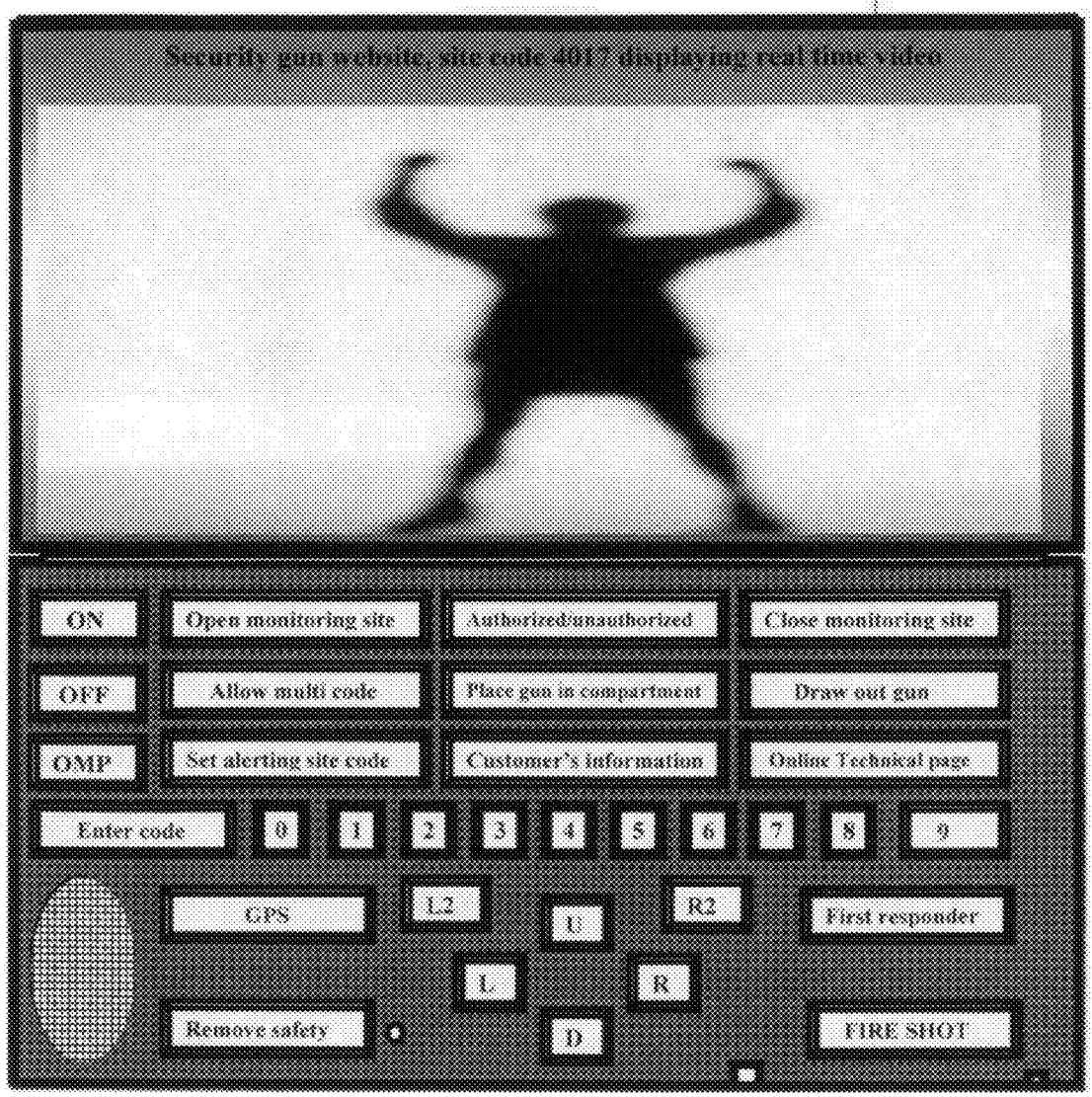

In FIG. 15, the OMP button means operator must push. The provider can set the OMP button so that the person monitoring the site code of a particular security gun 400 must push the button once every 30 minute. If the users don't push the button within that time frame, the coding system 500 will automatically contact the supervisor or the provider by sending message through the security gun website to the provider, and then the coding system 500 will shut down automatically. Furthermore, many users can be allowed to monitor a particular site code using many coding systems 500. When there is an emergency, the first user to push the first responder button, is the user that can operate the security gun 400 in the location that the users are monitoring. The user then uses the navigation buttons L, R, D, and U which are meant for navigating, moving the gun to any preferred position of the users choice, the user can also move the embodiment of the security gun 400 to turn, move or spin around to any degree even 360degree on a pole 317. the security gun 400 moves around when it is mounted on a pole 317 the user can move the security gun 400 around by pushing the L2 or R2 button located on the coding system 500, a special mechanical part or brake system in the security gun 400 stops and holds the security gun 400 from moving when the user releases the L2 or R2 button located on the embodiment of the coding system 500, an electric motor and some mechanical parts located inside the security gun are connected to the joint area 320, which is also the part for inserting a pole 320, the electric motor enable the embodiment of the security gun to move 360 degree when the L2 or R2 button is pushed, the L2 button enable the embodiment of the security gun 400 to turn left, the R2 button enable the security gun 400 to turn right. The L2 and the R2 button are similar to the functions of the L and R button located on the embodiment of the coding system 500. The user can fire shot at a suspect or a target by first pushing the draw out gun button and then the remove safety button and then the user pushes the fire shot button. The coding system can be used for many purpose examples for war combat, or for protecting a remote location and can also be use for training purpose, example online gun range that allows people to pay service fees to practice using the coding system to operate the security gun by shooting at a target in a remote locations setup by the provider of the security gun.

Figure 16:
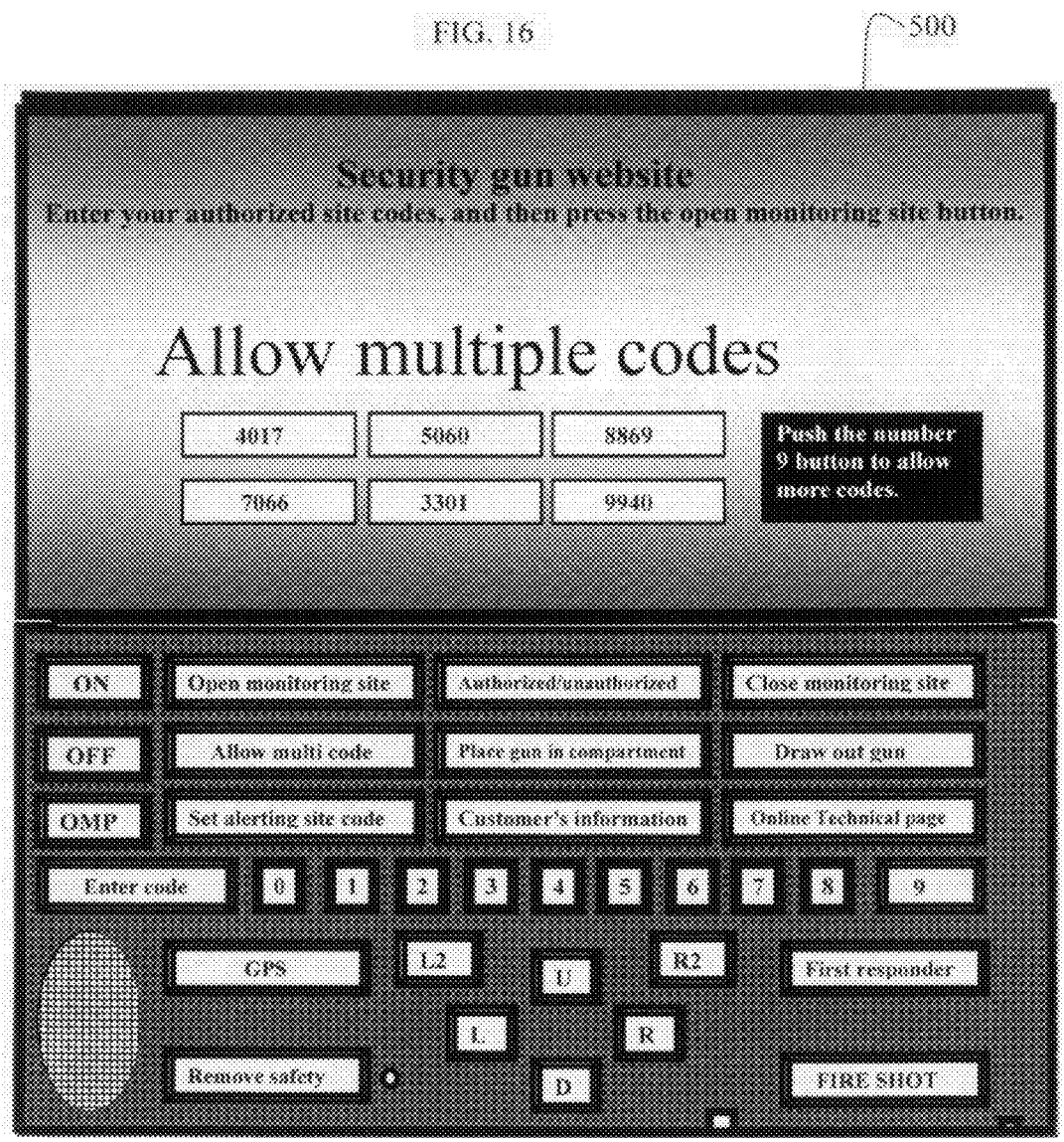

In FIG. 16, the user can enter multiple site code by pushing allow multiple site code button. This button will allow the user to enter multiple site codes that will allow the user to monitor the location of multiple security guns 400. When the allow multiple site code button is pushed by the user, the user will have the option to enter multiple site code numbers, when the multiple site code numbers are entered, the user must push enter code to reveal multiple real time videos detected by the camera in the security guns link to the site codes entered by the user.

Figure 17:
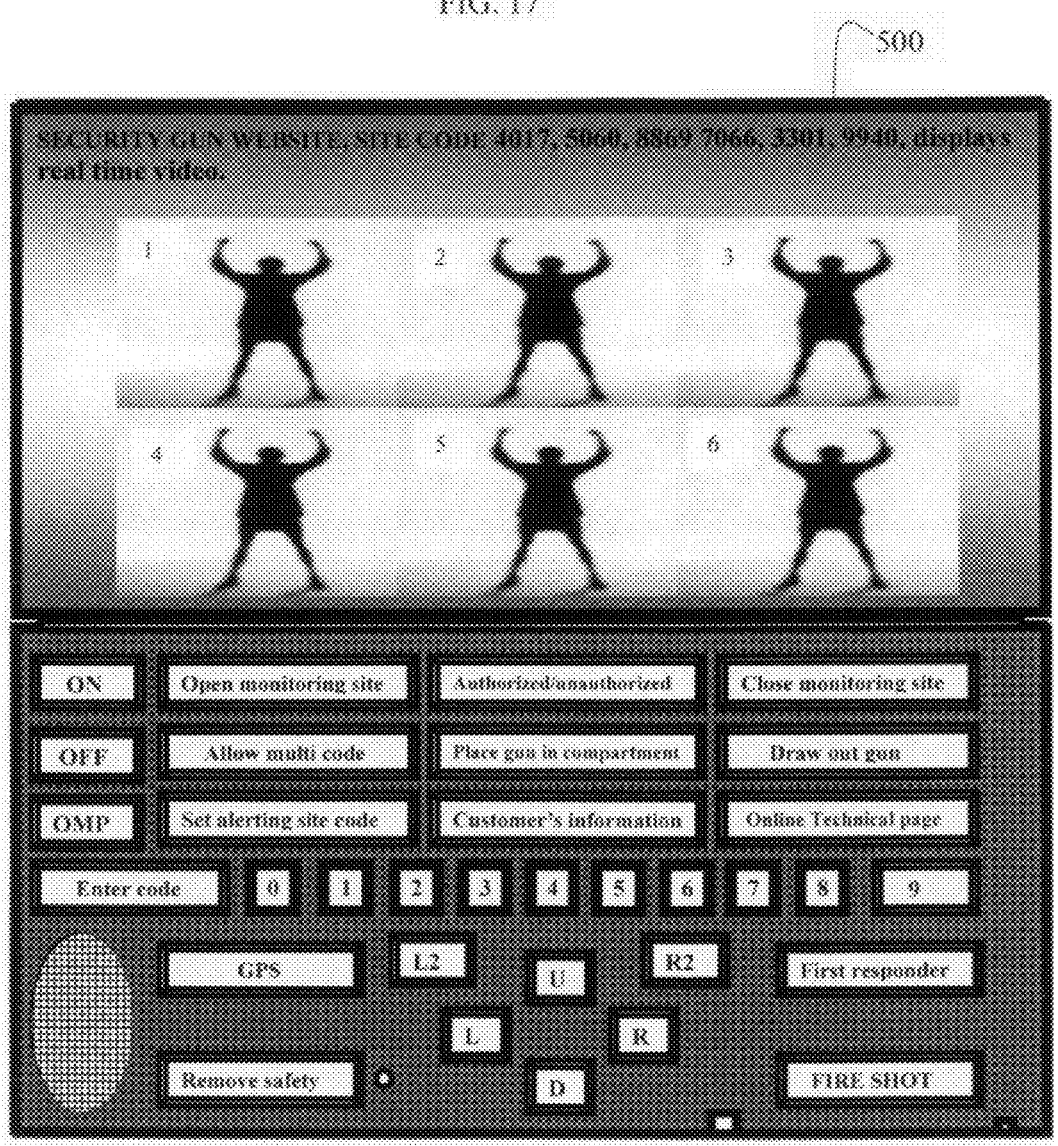
Figure 18:
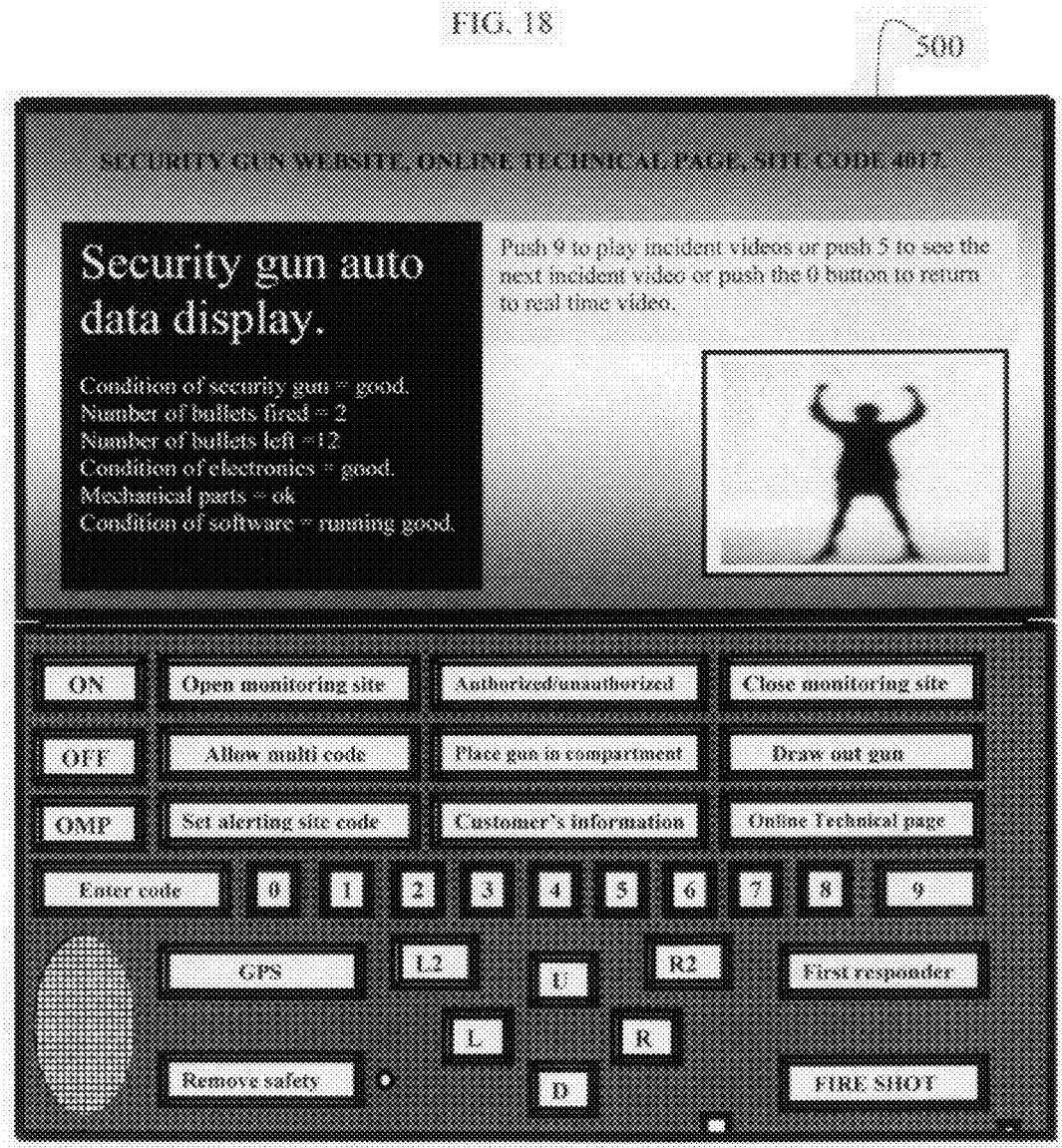

In FIG. 17, the user can only operate one security gun at a time. The user selects a particular security gun to operate by entering the number displayed on the real time video in the monitor, the number displayed is entered with the use of the 0 to 9 buttons in the coding system 500, example if the number 5 is displayed on a particular real time video, the number 5 will be push selecting that real time video only. Selecting that real time video only means viewing only that real time video and controlling the security gun 400 in the location that is monitored.

in FIG. 18, the online technical page button is pushed by the user. The coding system 500 automatically displays online technical page, for example, site code 4017. The Online Technical page button can be pushed by the user when the user is monitoring any site code, for example site code 4017, this button when pushed will allow the user to check the information, or condition of the security gun 400. The user can check information like, condition of the security gun 400, number of bullets fired, and number of bullets left, condition of electronics, condition of mechanical parts, the condition of software. The user will be able to watch any incident videos. Incident videos are videos that are automatically saved in the security gun website whenever the security gun 400 is drawn, or fired. The security gun automatically records any incident video captured by the camera when the gun 308 is drawn out of it safety compartment and stores the video in the security gun website. The user can push button 9 to play incident videos or push button 5 to see the next incident video or push the 0 button to return to real time video.

The cameras in the security gun 400 can be a visible light camera or an infrared camera for night vision.

Figure 19:
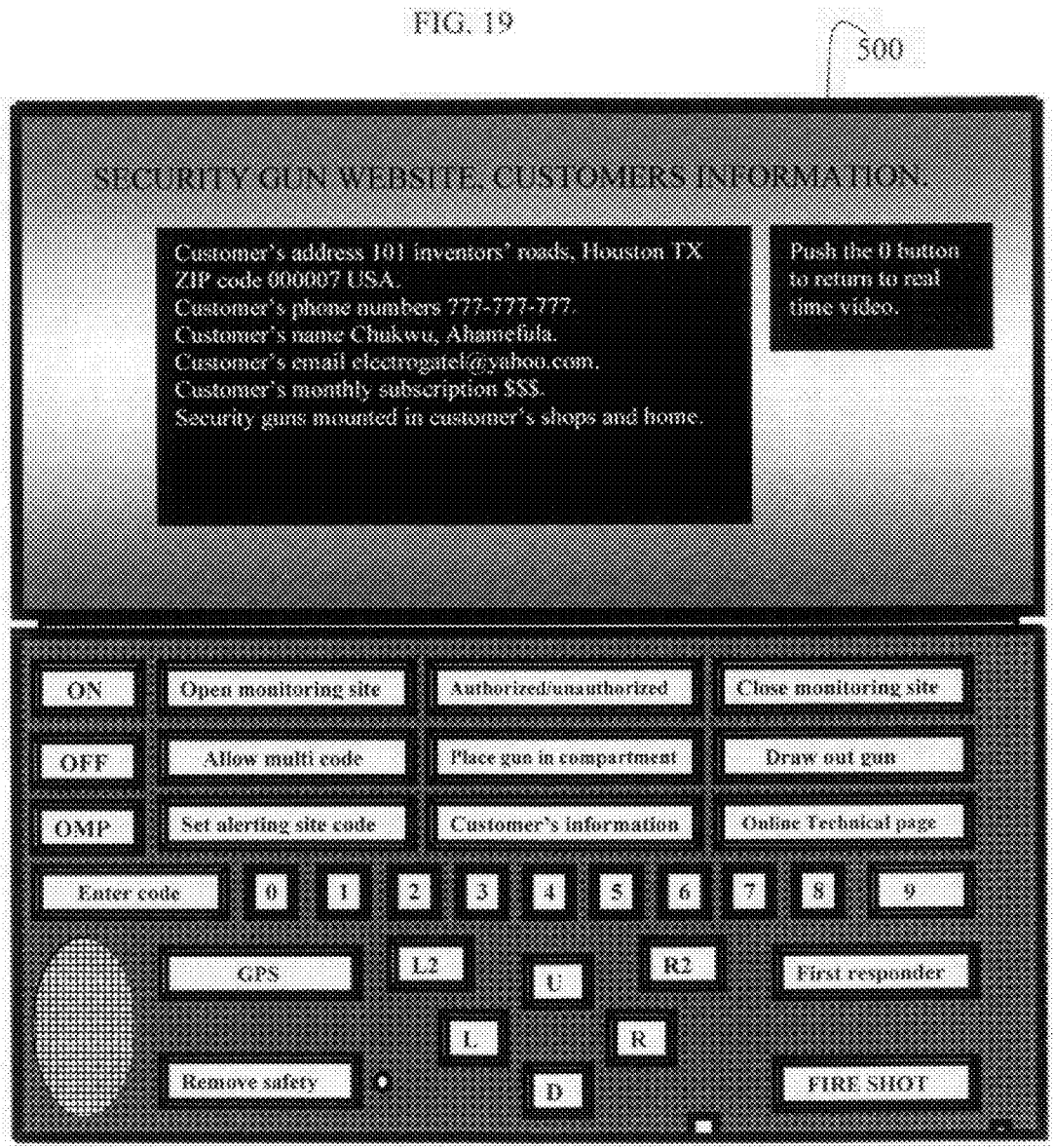

In FIG. 19, the customer's information button is pushed by the user. The user can push this button to check customer's information while monitoring a particular security gun. Customer's information like; customer's name, customer's addresses, customer's email, customer's monthly subscription etc. The user can also get other information like the locations were the security gun 400 is mounted on customer's property. The customer's information has been pre-programmed in the security gun website by the security gun provider with a special computer.

Figure 20:
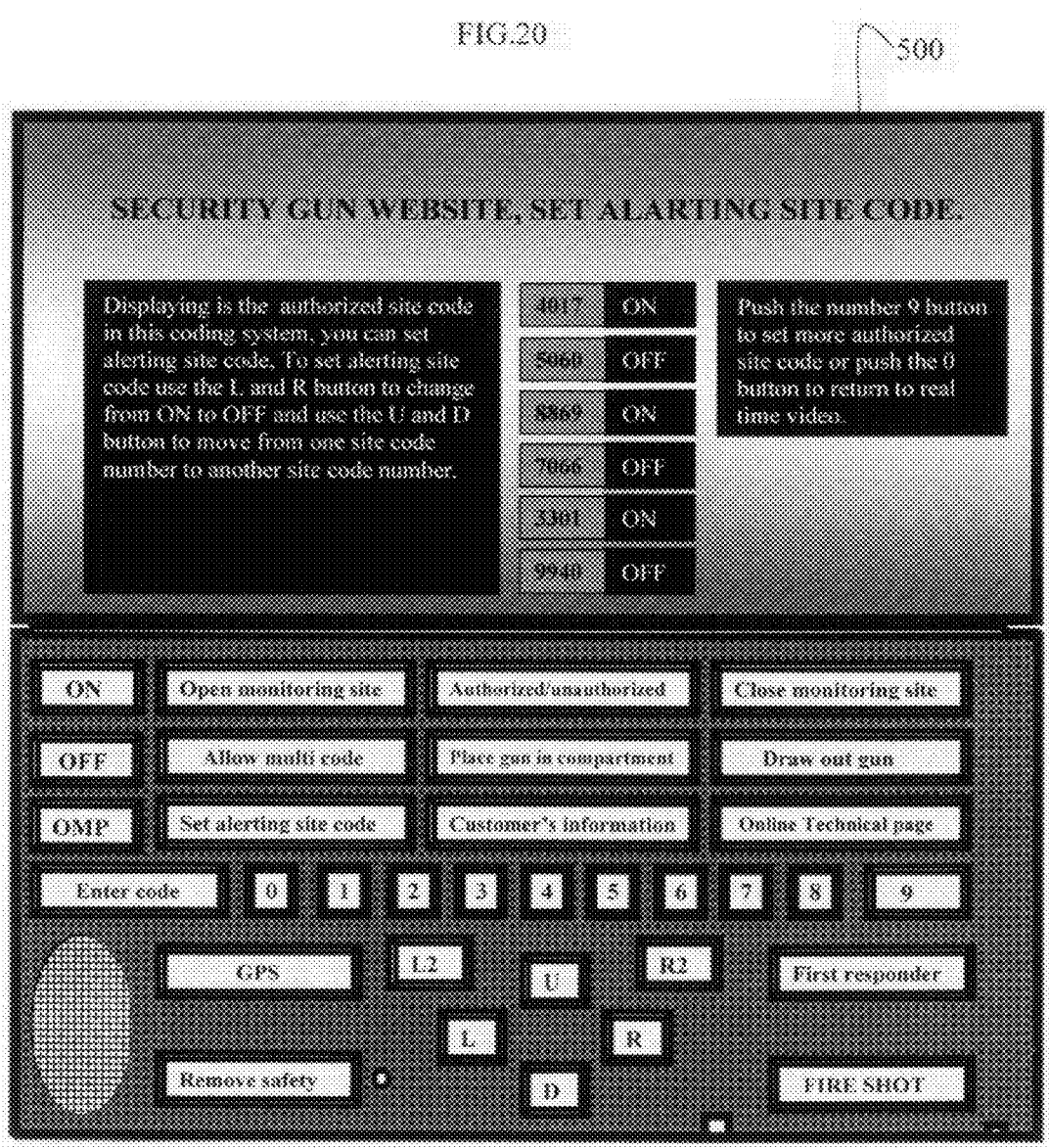

In FIG. 20, the set alerting site code button is pushed by the user. The monitor automatically displays the option to set alerting site code. Setting alerting site codes means, setting the coding system 500 to alert the user, if the motion detector in a security gun 400 detects any movement in the location were the security gun 400 is mounted, it will automatically alert the person monitoring the security gun website, even if the person at the time is monitoring another security gun, the coding system alert the user by displaying a real time video signal detected by the camera in the security gun, real time video of the location of the security gun 400.

Figure 21:
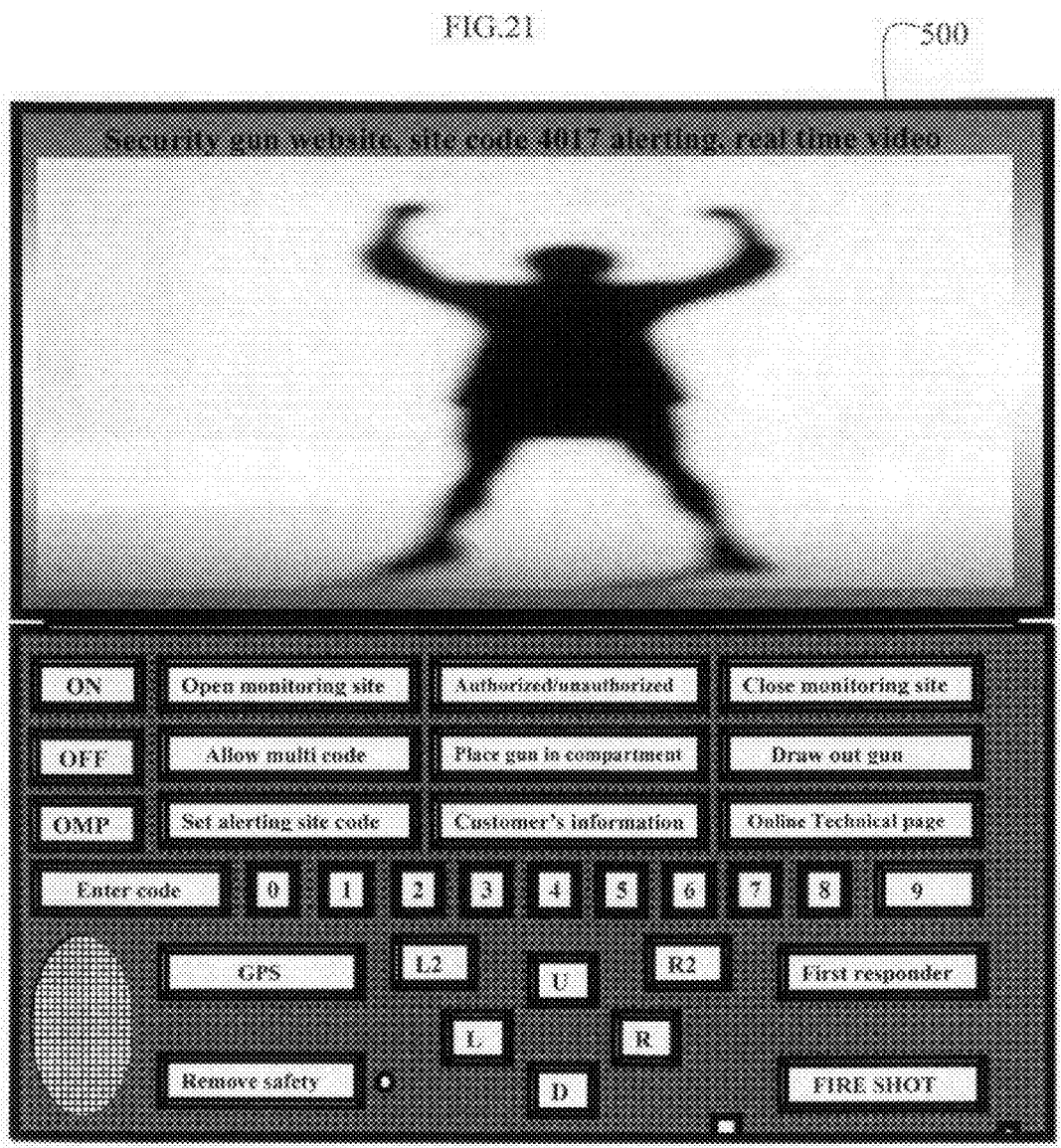

In FIG. 21, there is a video alert displayed on the monitor, the alert was because the motion detector in the security gun 400 detected movement in it's mounted location, the camera automatically send the real time video signal to the security gun website to be seen by the security gun operator. If the real time video is an emergency that require drawing out the gun, the person monitoring the security gun website can take action by pushing the draw out gun button, and then push the navigating button to position the gun 308. Shots are fired by first pushing the remove safety button and then pushing the fire shot button. The remove safety button is a safety measure to prevent accidental discharge, and must be push by the security gun operator before pushing fire shot button. Pushing the fire shot button without first pushing the remove safety button will result to no shot fired; meaning shot cannot be fired without pushing the remove safety button. The laser pointer on the gun 308 automatically comes ON when the gun 308 is drawn.

Figure 22:
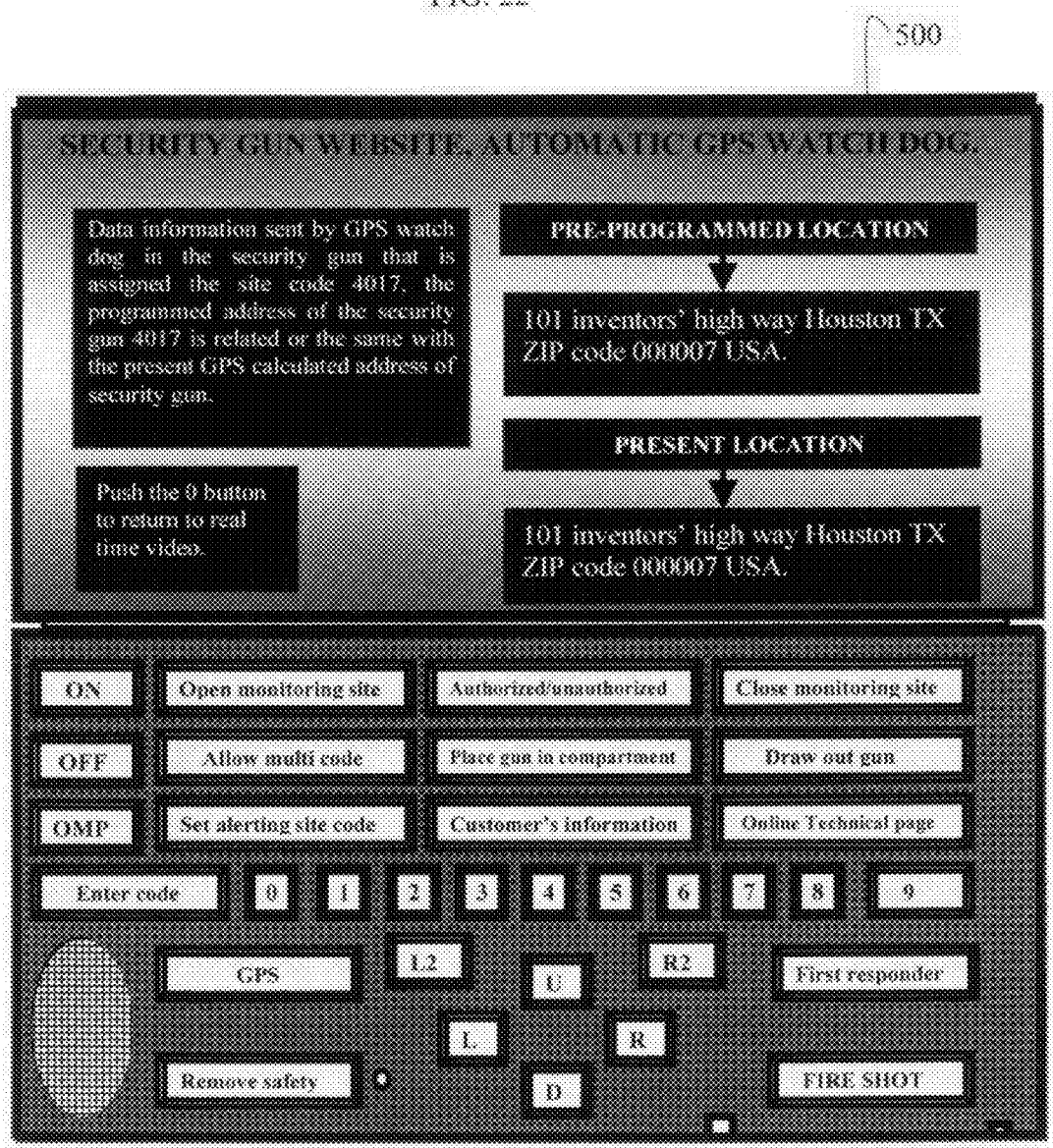

In FIG. 22, when the GPS button is pushed; the user can see the pre-programmed address of the security gun 400 that is monitored through the security gun website. A GPS watch dog in the security gun 400 calculate the present address of the security gun 400 and the information is automatically displayed on the monitoring site comparing the pre-programmed address of the security gun 400 with the present address calculated by the GPS watch dog, if the present address of the security gun does not match or relate to the pre-programmed address of the security gun 400, the security gun 400 will automatically be blocked from service, meaning the security gun 400 cannot be operated by the coding system. In this drawing the coding system displays that the pre-programmed address of the security gun 400 assigned the site code 4017 is the same or related to the present address calculated by the GPS watch dog, in this case the security gun 400 is not blocked from service.

In FIG. 23 the present address of the security gun assigned the site 4017 does not match or relate to the pre-programmed address of the security gun so the security gun is automatically blocked from service, this data is displayed by the GPS watch dog.

The address or location of the security gun 400 is pre-programmed by the security gun provider. The security gun 400 will automatically be blocked, meaning the security gun 400 cannot be operated by the user when it is removed from the location, or address pre-programmed by the provider, even if there is Wi-Fi internet network in the new location or address. The security gun 400 cannot be controlled anymore except it is unblock by the provider, this is a security measure to stop wrong use of the security gun 400.

The security gun 400 may be owned or leased by users. The security gun 400 is monitored by a security agent or the user that is licensed and permitted to operate or monitor the security gun 400. The security gun 400 is tracked by GPS or other position sensing devices. If the users want to change the location or address of the security gun 400, the user must contact the security gun 400 provider to change the security gun 400 to the new address or location without any problem. Users of the security gun 400 will pay subscription fees to enjoy the safety the security gun provides in their property.

Whenever the person operating the coding system 500 push any of the following buttons, [customer's information, online technical page, set alerting site code, allow multi code, GPS, authorized/unauthorized,] and the user wants to return to the real time video, the user should push the 0 button on the coding system 500, to return to the real time video that is displayed on the site code the user is monitoring. This information is automatically displayed on the monitor in the coding system 500.

The user can close a monitoring site by pushing the close monitoring site button. The coding system 500 is turned off by pushing the off button in the coding system 500.

A special navigation stick can be connected to the input 705, in the embodiment of coding system 500 see FIG. 23. The navigating stick can be use by users to navigate the gun 308, to point to any direction when the gun 308 is drawn out. The four navigating buttons, works very well so users may not have to use a navigating stick. Therefore, most help information on how to use the coding system 500 are automatically displayed on the monitor in the coding system 500, so authorized users will not have any difficulties using the coding system 500.

The security gun 400 comes as a semiautomatic gun 308 with moving parts, the coding system and the security gun is powered by a battery, or an ac power supply.

The security gun 400 can also come as an electrical gun 308 with no moving parts, meaning the bullets in the gun 308 are ignited by electrical charge not the movement of the internal parts that triggers or ignites the bullets.

The security gun 400 comes in any size and shape. The security gun 400 will comes as any caliber gun 308. The security gun 400 will be built with special software and the best electronics, electrical and mechanical materials, which include electric motors and many special electronics circuits like internet/Wi-Fi transceiver, cameras and many other special electronics circuits that will be built with special components like microchips, resistors, transistors microprocessors, motion detector, and other special electronics components. The embodiment of the security gun 400 is built with metal, plastic, and other special material.

The coding system 500 will be built with software and special electronics components and materials, which include special electronics circuits like internet/Wi-Fi transceiver, and many other special electronics circuits that are built with special components like microchips, transistors, microprocessors, liquid crystal display LCD and many other special electronics components. The embodiment of the coding system is built with plastic and other special materials.

I claim:
1. A gun system secured to a wall, the gun system comprising:
   a body;
   a gun hand pivotally attached to the body at one end and rigidly attached to a gun at a second end;
   a safety compartment attached to a side of the body, the safety compartment forming a cavity configured to receive the gun therein;
   a flip gate pivotally attached to an opening of the safety compartment and configured to conceal the gun within the safety compartment;
   a microphone attached to a second side of the body;
   a camera secured to the second side of the body;
   a motion detector secured to the second side of the body;
   a loud speaker secured to the second side of the body;
   a laser pointer secured to the second side of the body;
   a pole mount rigidly attached to the body and configured to secure the body to a support structure;
   an internet connectable module operably associated with an electric motor associated with the gun hand, the internet connectable module being configured to receive commands from a remote monitoring site and configured to control movement of the gun via the electric motor and gun hand;
   wherein the camera is configured to relay real-time images to the remote monitoring site;
   wherein the microphone and the loud speaker are configured to relay sound to a person proximate to the body; and
   wherein the motion detector is configured to detect the presence of the person and thereafter activate the camera.

2. A gun system of claim 1, further comprising:
a global positioning system secured to the body;
wherein the gun is deactivated if the body is positioned outside a pre-programmed location determined by the global positioning system.

* * * * *